(12) United States Patent
Kono et al.

(10) Patent No.: US 11,861,932 B2
(45) Date of Patent: Jan. 2, 2024

(54) DETECTION DEVICE

(71) Applicant: Japan Display Inc., Tokyo (JP)

(72) Inventors: Takaaki Kono, Tokyo (JP); Akihiko Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/992,048

(22) Filed: Nov. 22, 2022

(65) Prior Publication Data

US 2023/0169788 A1 Jun. 1, 2023

(30) Foreign Application Priority Data

Nov. 26, 2021 (JP) .................................. 2021-192136

(51) Int. Cl.
*G06V 40/13* (2022.01)
*H04N 25/78* (2023.01)
*G06V 10/145* (2022.01)

(52) U.S. Cl.
CPC ........ *G06V 40/1318* (2022.01); *G06V 10/145* (2022.01); *G06V 40/1329* (2022.01); *H04N 25/78* (2023.01)

(58) Field of Classification Search
CPC ............. G06V 40/1318; G06V 10/145; G06V 40/1329; H04N 25/78; H04N 25/708
See application file for complete search history.

(56) References Cited

U.S. PATENT DOCUMENTS

| 2016/0358956 A1* | 12/2016 | Chang ............... H01L 27/14612 |
| 2017/0124370 A1* | 5/2017 | He ......................... G06V 40/40 |
| 2018/0012069 A1 | 1/2018 | Chung et al. |

FOREIGN PATENT DOCUMENTS

CN 108280432 A * 7/2018 ........... G06K 9/0004

* cited by examiner

*Primary Examiner* — Abhishek Sarma
(74) *Attorney, Agent, or Firm* — K&L Gates LLP

(57) ABSTRACT

A detection device includes a sensor area provided with a plurality of detection elements each comprising a photoelectric conversion element in a detection area, and a detector configured to detect a potential difference between a voltage generated in a first detection element and a voltage generated in a second detection element adjacent to the first detection element in the detection area.

16 Claims, 25 Drawing Sheets

FIG.9

| m<br>n | 1 | 2 | 3 | ... | M-1 | M |
|---|---|---|---|---|---|---|
| 1 | V<1,1><br>-Vref | V<2,1><br>-Vref | V<3,1><br>-Vref | ... | V<M-1,1><br>-Vref | V<M,1><br>-Vref |
| 2 | V<1,2><br>-Vref | V<2,2><br>-Vref | V<3,2><br>-Vref | ... | V<M-1,2><br>-Vref | V<M,2><br>-Vref |
| : | : | : | : | : | : | : |
| N-2 | V<1,N-2><br>-Vref | V<2,N-2><br>-Vref | V<3,N-2><br>-Vref | ... | V<M-1,N-2><br>-Vref | V<M,N-2><br>-Vref |
| N-1 | V<1,N-1><br>-Vref | V<2,N-1><br>-Vref | V<3,N-1><br>-Vref | ... | V<M-1,N-1><br>-Vref | V<M,N-1><br>-Vref |
| N | V<1,N><br>-Vref | V<2,N><br>-Vref | V<3,N><br>-Vref | ... | V<M-1,N><br>-Vref | V<M,N><br>-Vref |

FIG.14

| m / n | 1 | 2 | 3 | ... | M-1 | M |
|---|---|---|---|---|---|---|
| 1 | A | A | A | ... | A | A |
| 2 | B | B | B | ... | B | B |
| ⋮ | ⋮ | ⋮ | ⋮ | ⋮ | ⋮ | ⋮ |
| N-1 | C | C | C | ... | C | C |

FIG.15

| m / n | 1 | 2 | 3 | ... | M-1 | M |
|---|---|---|---|---|---|---|
| 1 | V<1,1><br>-V<1,2> | V<2,1><br>-V<2,2> | V<3,1><br>-V<3,2> | ... | V<M-1,1><br>-V<M-1,2> | V<M,1><br>-V<M,2> |
| 2 | V<1,2><br>-V<1,3> | V<2,2><br>-V<2,3> | V<3,2><br>-V<3,3> | ... | V<M-1,2><br>-V<M-1,3> | V<M,2><br>-V<M,3> |
| ⋮ | ⋮ | ⋮ | ⋮ | ⋮ | ⋮ | ⋮ |
| N-1 | V<1,N-1><br>-V<1,N> | V<2,N-1><br>-V<2,N> | V<3,N-1><br>-V<3,N> | ... | V<M-1,N-1><br>-V<M-1,N> | V<M,N-1><br>-V<M,N> |

FIG.18

| m/n | 1 | 2 | ... | N-1 |
|---|---|---|---|---|
| 1 | A | B | ... | C |
| 2 | E | F | ... | G |
| ... | ... | ... | ... | ... |
| P | I | J | ... | K |
| P+1 | A | B | ... | C |
| P+2 | E | F | ... | G |
| ... | ... | ... | ... | ... |
| 2P | I | J | ... | K |
| ... | ... | ... | ... | ... |
| M-P+1 | A | B | ... | C |
| M-P+2 | E | F | ... | G |
| ... | ... | ... | ... | ... |
| M | I | J | ... | K |

FIG. 19

| n \ m | 1 | 2 | ... | P | P+1 | P+2 | ... | 2P | ... | M-P+1 | M-P+2 | ... | M |
|---|---|---|---|---|---|---|---|---|---|---|---|---|---|
| 1 | V<1,1><br>-V<1,2> | V<2,1><br>-V<2,2> | ... | V<P,1><br>-V<P,2> | V<P+1,1><br>-V<P+1,2> | V<P+2,1><br>-V<P+2,2> | ... | V<2P,1><br>-V<2P,2> | ... | V<M-P+1,1><br>-V<M-P+1,2> | V<M-P+2,1><br>-V<M-P+2,2> | ... | V<M,1><br>-V<M,2> |
| 2 | V<1,2><br>-V<1,3> | V<2,2><br>-V<2,3> | ... | V<P,2><br>-V<P,3> | V<P+1,2><br>-V<P+1,3> | V<P+2,2><br>-V<P+2,3> | ... | V<2P,2><br>-V<2P,3> | ... | V<M-P+1,2><br>-V<M-P+1,3> | V<M-P+2,2><br>-V<M-P+2,3> | ... | V<M,2><br>-V<M,3> |
| ... | ... | ... | ... | ... | ... | ... | ... | ... | ... | ... | ... | ... | ... |
| N-1 | V<1,N-1><br>-V<1,N> | V<2,N-1><br>-V<2,N> | ... | V<P,N-1><br>-V<P,N> | V<P+1,N-1><br>-V<P+1,N> | V<P+2,N-1><br>-V<P+2,N> | ... | V<2P,N-1><br>-V<2P,N> | ... | V<M-P+1,N-1><br>-V<M-P+1,N> | V<M-P+2,N-1><br>-V<M-P+2,N> | ... | V<M,N-1><br>-V<M,N> |

FIG.22

| m\n | 1 | 2 | 3 | .. | P | P+1 | P+2 | P+3 | .. | 2P | .. | M-P+1 | M-P+2 | M-P+3 | .. | M |
|---|---|---|---|---|---|---|---|---|---|---|---|---|---|---|---|---|
| 1 | A | B | C | .. | D | A | B | C | .. | D | .. | A | B | C | .. | D |
| 2 | E | F | G | .. | H | E | F | G | .. | H | .. | E | F | G | .. | H |
| 3 | I | J | K | .. | L | I | J | K | .. | L | .. | I | J | K | .. | L |
| .. | .. | .. | .. | .. | .. | .. | .. | .. | .. | .. | .. | .. | .. | .. | .. | .. |
| N-1 | M | N | O | .. | P | M | N | O | .. | P | .. | M | N | O | .. | P |

FIG.23

| m/n | 1 | 2 | 3 | ... | P | P+1 | P+2 | P+3 | ... | 2P | ... | M-P+1 | M-P+2 | M-P+3 | ... | M |
|---|---|---|---|---|---|---|---|---|---|---|---|---|---|---|---|---|
| 1 | V<1,1><br>-V<1,2> | V<2,1><br>-V<2,2> | V<3,1><br>-V<3,2> | ... | V<P,1><br>-V<P,2> | V<P+1,1><br>-V<P+1,2> | V<P+2,1><br>-V<P+2,2> | V<P+3,1><br>-V<P+3,2> | ... | V<2P,1><br>-V<2P,2> | ... | V<M-P+1,1><br>-V<M-P+1,2> | V<M-P+2,1><br>-V<M-P+2,2> | V<M-P+3,1><br>-V<M-P+3,2> | ... | V<M,1><br>-V<M,2> |
| 2 | V<1,2><br>-V<1,3> | V<2,2><br>-V<2,3> | V<3,2><br>-V<3,3> | ... | V<P,2><br>-V<P,3> | V<P+1,2><br>-V<P+1,3> | V<P+2,2><br>-V<P+2,3> | V<P+3,2><br>-V<P+3,3> | ... | V<2P,2><br>-V<2P,3> | ... | V<M-P+1,2><br>-V<M-P+1,3> | V<M-P+2,2><br>-V<M-P+2,3> | V<M-P+3,2><br>-V<M-P+3,3> | ... | V<M,2><br>-V<M,3> |
| 3 | V<1,3><br>-V<1,4> | V<2,3><br>-V<2,4> | V<3,3><br>-V<3,4> | ... | V<P,3><br>-V<P,4> | V<P+1,3><br>-V<P+1,4> | V<P+2,3><br>-V<P+2,4> | V<P+3,3><br>-V<P+3,4> | ... | V<2P,3><br>-V<2P,4> | ... | V<M-P+1,3><br>-V<M-P+1,4> | V<M-P+2,3><br>-V<M-P+2,4> | V<M-P+3,3><br>-V<M-P+3,4> | ... | V<M,3><br>-V<M,4> |
| ... | ... | ... | ... | ... | ... | ... | ... | ... | ... | ... | ... | ... | ... | ... | ... | ... |
| N-1 | V<1,N-1><br>-V<1,N> | V<2,N-1><br>-V<2,N> | V<3,N-1><br>-V<3,N> | ... | V<P,N-1><br>-V<P,N> | V<P+1,N-1><br>-V<P+1,N> | V<P+2,N-1><br>-V<P+2,N> | V<P+3,N-1><br>-V<P+3,N> | ... | V<2P,N-1><br>-V<2P,N> | ... | V<M-P+1,N-1><br>-V<M-P+1,N> | V<M-P+2,N-1><br>-V<M-P+2,N> | V<M-P+3,N-1><br>-V<M-P+3,N> | ... | V<M,N-1><br>-V<M,N> |

FIG.26

| m\n | 1 | 2 | .. | N |
|---|---|---|---|---|
| 1 | A | E | .. | I |
| 2 | B | F | .. | J |
| .. | .. | .. | .. | .. |
| P-1 | C | G | .. | K |
| P | D | H | .. | L |
| P+1 | A | E | .. | I |
| P+2 | B | F | .. | J |
| .. | .. | .. | .. | .. |
| 2P-1 | C | G | .. | K |
| 2P | D | H | .. | L |
| .. | .. | .. | .. | .. |
| M-P+1 | A | E | .. | I |
| M-P+2 | B | F | .. | J |
| .. | .. | .. | .. | .. |
| M-1 | C | G | .. | K |

FIG.27

| m/n | 1 | 2 | .. | P-1 | P | P+1 | P+2 | .. | 2P-1 | 2P | .. | M-P+1 | M-P+2 | .. | M-1 |
|---|---|---|---|---|---|---|---|---|---|---|---|---|---|---|---|
| 1 | V<1,1><br>-V<2,1> | V<2,1><br>-V<3,1> | .. | V<P-1,1><br>-V<P,1> | V<P,1><br>-V<P+1,1> | V<P+1,1><br>-V<P+2,1> | V<P+2,1><br>-V<P+3,1> | .. | V<2P-1,1><br>-V<2P,1> | V<2P,1><br>-V<2P+1,1> | .. | V<M-P+1,1><br>-V<M-P+2,1> | V<M-P+2,1><br>-V<3,1> | .. | V<M-1,1><br>-V<M,1> |
| 2 | V<1,2><br>-V<2,2> | V<2,2><br>-V<3,2> | .. | V<P-1,2><br>-V<P,2> | V<P,2><br>-V<P+1,2> | V<P+1,2><br>-V<P+2,2> | V<P+2,2><br>-V<P+3,2> | .. | V<2P-1,2><br>-V<2P,2> | V<2P,2><br>-V<2P+1,2> | .. | V<M-P+1,2><br>-V<M-P+2,2> | V<M-P+2,2><br>-V<3,2> | .. | V<M-1,2><br>-V<M,2> |
| .. | .. | .. | .. | .. | .. | .. | .. | .. | .. | .. | .. | .. | .. | .. | .. |
| N | V<1,N><br>-V<2,N> | V<2,N><br>-V<3,N> | .. | V<P-1,N><br>-V<P,N> | V<P,N><br>-V<P+1,N> | V<P+1,N><br>-V<P+2,N> | V<P+2,N><br>-V<P+3,N> | .. | V<2P-1,N><br>-V<2P,N> | V<2P,N><br>-V<2P+1,N> | .. | V<M-P+1,N><br>-V<M-P+2,N> | V<M-P+2,N><br>-V<M-P+3,N> | .. | V<M-1,N><br>-V<M,N> |

DETECTION DEVICE

CROSS-REFERENCE TO RELATED APPLICATION

This application claims the benefit of priority from Japanese Patent Application No. 2021-192136 filed on Nov. 26, 2021, the entire contents of which are incorporated herein by reference.

BACKGROUND

1. Technical Field

The present disclosure relates to a detection device.

2. Description of the Related Art

In these years, optical biometric sensors are known as biometric sensors used for personal authentication, for example. Fingerprint sensors (refer to United States Patent Application Publication No. 2018/0012069 (US-A-2018/0012069), for example) and vein sensors are known as such biometric sensors. In a fingerprint sensor described in US-A-2018/0012069, a plurality of photoelectric conversion elements such as photodiodes are arranged on a semiconductor substrate. Each of the photoelectric conversion elements outputs a signal that changes according to the amount of light emitted thereto.

For example, when detecting asperities on a surface of an object to be detected, such as a fingerprint, or a vein in a finger, if the Gain (degree of amplification) at an analog stage is increased to detect a slight difference in the signal output from each of the photoelectric conversion elements, a data overflow (digit overflow) may occur in digital processing at the subsequent stage, thus, disabling good detection.

It is an object of the present disclosure to provide a detection device capable of achieving an improvement in detection accuracy without causing a data overflow.

SUMMARY

A detection device according to an embodiment of the present disclosure includes a sensor area provided with a plurality of detection elements each comprising a photoelectric conversion element in a detection area, and a detector configured to detect a potential difference between a voltage generated in a first detection element and a voltage generated in a second detection element adjacent to the first detection element in the detection area.

BRIEF DESCRIPTION OF THE DRAWINGS

FIG. 9 is a chart illustrating examples of digital data obtained during the detection operation of the detection device according to the comparative example;

FIG. 14 is a chart illustrating a correspondence relation of the digital data obtained at each sampling time in the timing diagram illustrated in FIG. 13;

FIG. 15 is a chart illustrating examples of the digital data obtained during the detection operation of the detection device according to the first embodiment;

FIG. 18 is a chart illustrating a correspondence relation of the digital data obtained at each sampling time in the timing diagram illustrated in FIG. 17;

FIG. 19 is a chart illustrating examples of the digital data obtained during the detection operation of the signal line selection circuit and the detection circuit according to the first embodiment;

FIG. 22 is a chart illustrating a correspondence relation of the digital data obtained at each sampling time in the timing diagram illustrated in FIG. 21;

FIG. 23 is a chart illustrating examples of the digital data obtained during the detection operation of the signal line selection circuit and the detection circuit according to the modification of the first embodiment;

FIG. 26 is a chart illustrating a correspondence relation of the digital data obtained at each sampling time in the timing diagram illustrated in FIG. 25; and FIG. 27 is a chart illustrating examples of the digital data obtained during the detection operation of the signal line selection circuit and the detection circuit according to the second embodiment.

DETAILED DESCRIPTION

Figure 1:
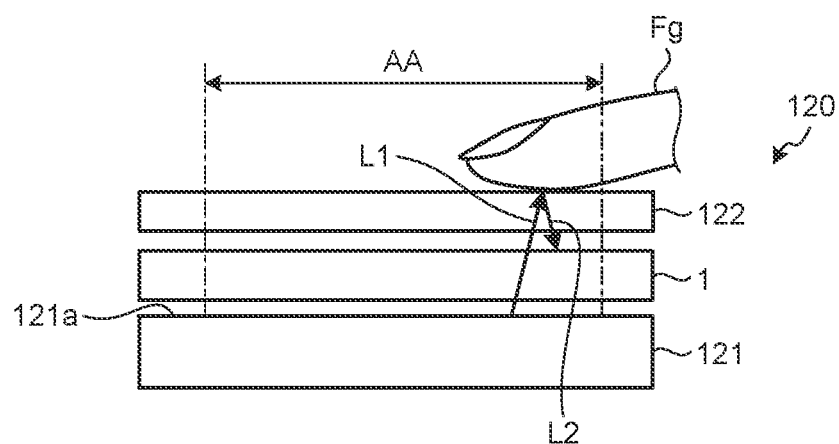
FIG. 1 is a sectional view illustrating a schematic sectional configuration of a detection apparatus having an illumination device, the detection apparatus including a detection device according to an embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

FIG. 1 is a sectional view illustrating a schematic sectional configuration of a detection apparatus having an illumination device, the detection apparatus including a detection device according to an embodiment of the present disclosure. As illustrated in FIG. 1, a detection apparatus 120 having an illumination device includes a detection device 1, an illumination device 121, and a cover glass 122. The illumination device 121, the detection device 1, and the cover glass 122 are stacked in this order in a direction orthogonal to a surface of the detection device 1. In the present disclosure, the detection device 1 is an optical sensor that detects a finger Fg according to an amount of light received.

The illumination device 121 has a light-emitting surface 121a for emitting light, and emits light L1 from the light-emitting surface 121a toward the detection device 1. The illumination device 121 is a backlight. The illumination device 121 may be, for example, what is called a side light-type backlight that includes a light guide plate provided in a position corresponding to a detection area AA and a plurality of light sources arranged at one end or both ends of the light guide plate. For example, light-emitting diodes (LEDs) for emitting light in a predetermined color are used as the light sources. The illumination device 121 may be what is called a direct-type backlight that includes the light sources (such as the LEDs) provided directly below the detection area AA. The illumination device 121 is not limited to the backlight, and may be provided on a lateral side or an upper side of the detection device 1, and may emit the light L1 from the lateral side or the upper side of the finger Fg.

The detection device 1 is provided so as to face the light-emitting surface 121a of the illumination device 121. The light L1 emitted from the illumination device 121 passes through the detection device 1 and the cover glass 122. The detection device 1 is, for example, a light-reflective biometric sensor, and can detect asperities (such as a fingerprint) on a surface of the finger Fg by detecting light L2 reflected on the surface of the finger Fg. Alternatively, the detection device 1 may detect information on a living body by detecting the light L2 reflected in the finger Fg, in addition to detecting the fingerprint. Examples of the information on the living body include a blood vessel image, pulsation, and a pulse wave of, for example, a vein. The color of the light L1 from the illumination device 121 may be varied according to a detection target.

The cover glass 122 is a member for protecting the detection device 1 and the illumination device 121, and covers the detection device 1 and the illumination device 121. The cover glass 122 is, for example, a glass substrate. The cover glass 122 is not limited to a glass substrate, and may be, for example, a resin substrate. The cover glass 122 need not be provided. In this case, the surface of the detection device 1 is provided with a protective layer, and the finger Fg contacts the protective layer of the detection device 1.

The detection apparatus 120 having an illumination device may be provided with a display panel instead of the illumination device 121. The display panel may be, for example, an organic electroluminescent (EL) (organic light-emitting diode (OLED)) display panel, or an inorganic EL (micro-LED or mini-LED) display panel. Alternatively, the display panel may be a liquid crystal display (LCD) panel using liquid crystal elements as display elements or an electrophoretic display (EPD) panel using electrophoretic elements as the display elements. Even in this case, display light emitted from the display panel passes through the detection device 1, and the fingerprint of the finger Fg and the information on the living body can be detected based on the light L2 reflected by the finger Fg.

Figure 2:
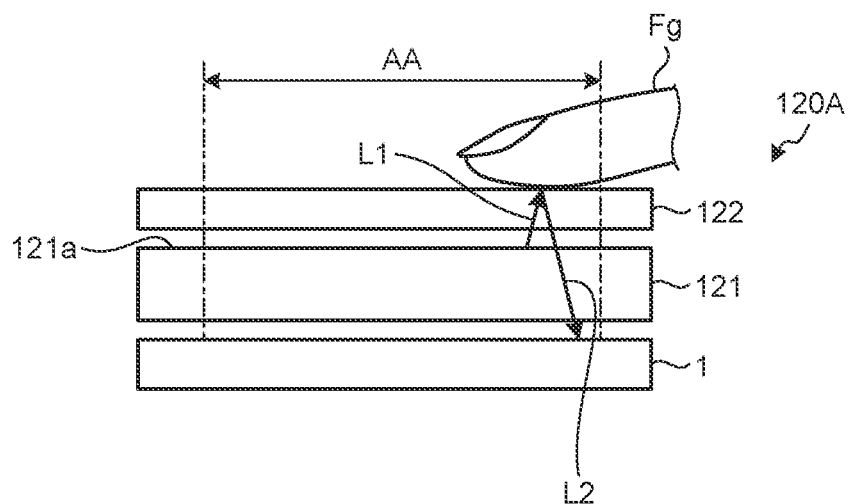
FIG. 2 is a sectional view illustrating a schematic sectional configuration of a detection apparatus having an illumination device according to a modification.

FIG. 2 is a sectional view illustrating a schematic sectional configuration of a detection apparatus having an illumination device according to a modification. As illustrated in FIG. 2, in the detection apparatus 120 having an illumination device, the detection device 1, the illumination device 121, the cover glass 122 are stacked in this order in the direction orthogonal to the surface of the detection device 1. Also, in the present modification, a display panel such as an organic EL display panel can be employed as the illumination device 121.

The light L1 emitted from the illumination device 121 passes through the cover glass 122, and then, is reflected by the finger Fg. The light L2 reflected by the finger Fg passes through the cover glass 122, and further passes through the illumination device 121. The detection device 1 can perform the detection of the information on the living body such as the fingerprint detection by receiving the light L2 that has passed through the illumination device 121.

Figure 3:
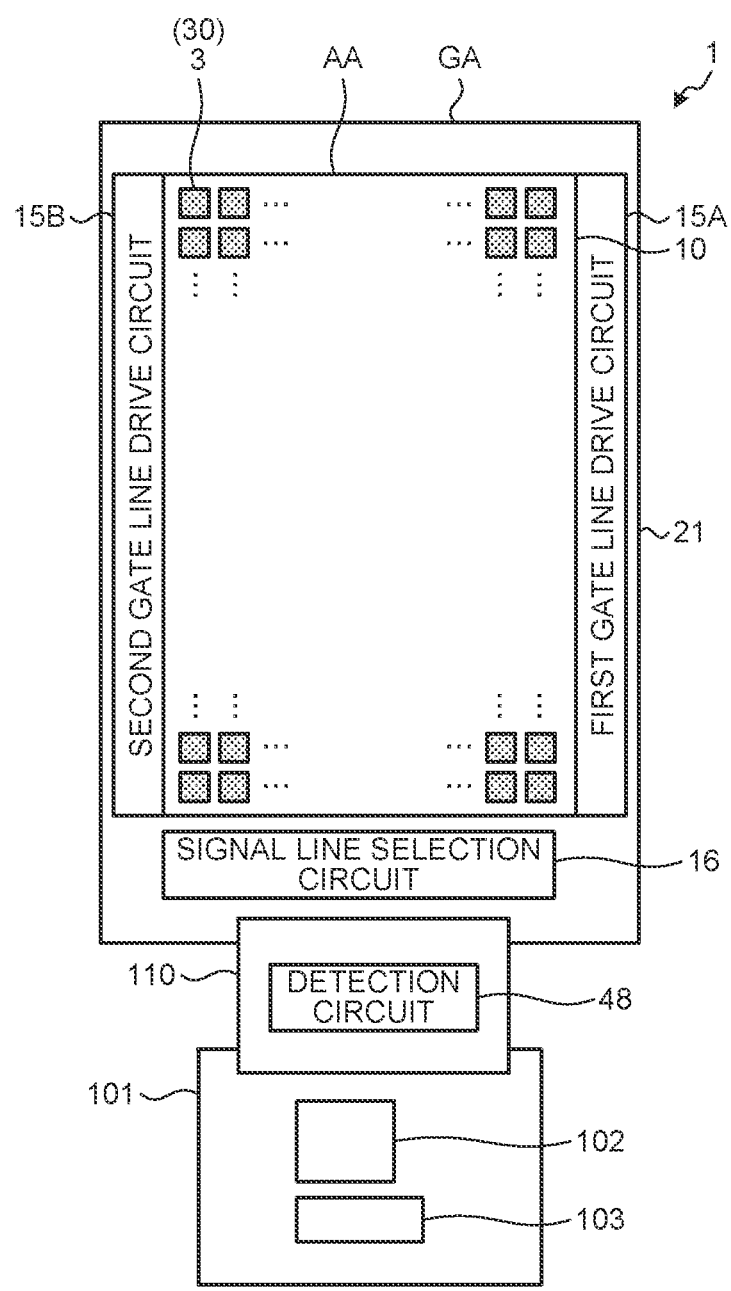
FIG. 3 is a plan view illustrating the detection device according to the embodiment.

FIG. 3 is a plan view illustrating the detection device according to the embodiment. As illustrated in FIG. 3, the detection device 1 includes a substrate 21, a sensor area 10, a first gate line drive circuit 15A, a second gate line drive circuit 15B, a signal line selection circuit 16, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor area 10, the first gate line drive circuit 15A, the second gate line drive circuit 15B, and the signal line selection circuit 16 to control a detection operation of the sensor area 10. The power supply circuit 103 supplies voltage signals including, for example, a power supply voltage Vsf and a common voltage Vcom (refer to FIG. 5) to the sensor area 10, the first gate line drive circuit 15A, the second gate line drive circuit 15B, and the signal line selection circuit 16.

The substrate 21 has the detection area AA and a peripheral area GA. The detection area AA is an area overlapping a plurality of detection elements 3 included in the sensor area 10. The peripheral area GA is an area outside the detection area AA, and is an area not overlapping the detection elements 3. That is, the peripheral area GA is an area between the outer perimeter of the detection area AA and the ends of the substrate 21. The first gate line drive circuit 15A, the second gate line drive circuit 15B, and the signal line selection circuit 16 are provided in the peripheral area GA.

Each of the detection elements 3 of the sensor area 10 is a photosensor including a photoelectric conversion element 30. The photoelectric conversion element 30 is a photodiode, and outputs an electrical signal corresponding to light irradiating each of the photoelectric conversion elements 30. More specifically, the photoelectric conversion element 30 is a positive-intrinsic-negative (PIN) photodiode. The detection elements 3 are arranged in a matrix having a row-column configuration in the detection area AA. The photoelectric conversion element 30 included in each of the detection elements 3 performs the detection according to gate drive signals (for example, a reset control signal RST and a read control signal RD) supplied from the first gate line drive circuit 15A and the second gate line drive circuit 15B. Each of the photoelectric conversion elements 30 outputs the electrical signal corresponding to the light irradiating the photoelectric conversion element 30 as a detection signal Vdet to the signal line selection circuit 16. The detection device 1 detects the information on the living body based on the detection signals Vdet received from the detection elements 3.

The first gate line drive circuit 15A, the second gate line drive circuit 15B, and the signal line selection circuit 16 are provided in the peripheral area GA. Specifically, the first gate line drive circuit 15A and the second gate line drive circuit 15B are provided in areas extending along a second direction Dy in the peripheral area GA. The signal line selection circuit 16 is provided in an area extending along a first direction Dx in the peripheral area GA, and is provided between the sensor area 10 and the detection circuit 48. The first gate line drive circuit 15A and the second gate line drive circuit 15B are arranged with the detection area AA interposed therebetween in the first direction Dx. The first gate line drive circuit 15A and the second gate line drive circuit 15B are not limited to this configuration, and may be formed as one circuit and arranged along one side of the detection area AA.

The first direction Dx is one direction in a plane parallel to the substrate 21. The second direction Dy is one direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the substrate 21.

The number of the detection elements 3 arranged in the first direction Dx in the detection area AA is, for example, 1080. The number of the detection elements 3 arranged in the second direction Dy in the detection area AA is, for example, 2340. In this case, 2340 element rows, in each of which 1080 of the detection elements 3 are arranged in the first direction Dx, are arranged in the second direction Dy in the detection area AA. In other words, 1080 element columns, in each of which 2340 of the detection elements 3 are arranged in the second direction Dy, are arranged in the first direction Dx in the detection area AA.

Figure 4:
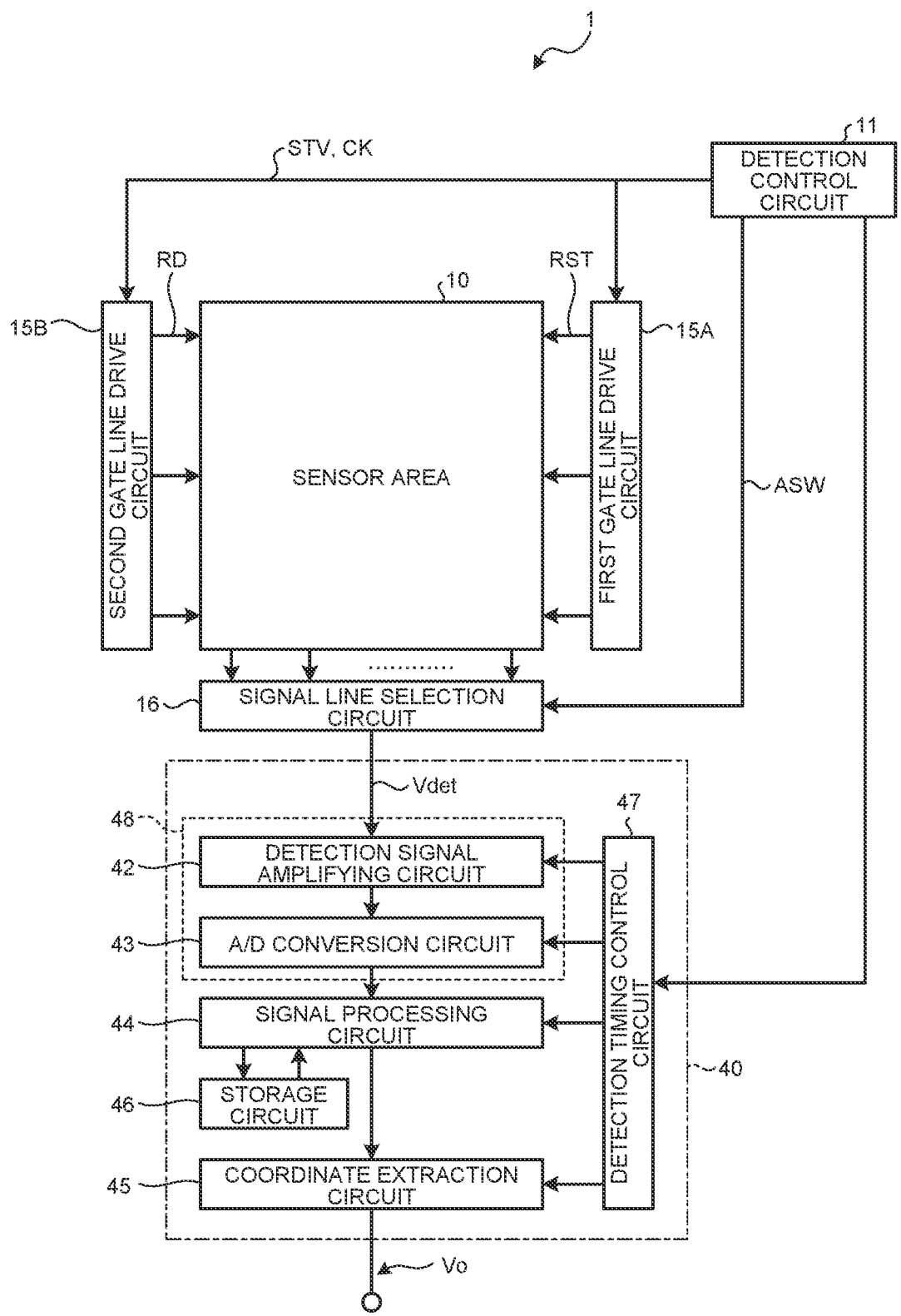
FIG. 4 is a block diagram illustrating a configuration example of the detection device according to the embodiment.

FIG. 4 is a block diagram illustrating a configuration example of the detection device according to the embodiment. As illustrated in FIG. 4, the detection device 1 further includes a detection control circuit 11 and a detector (detection processing circuit) 40. One, some, or all functions of the detection control circuit 11 are included in the control circuit 102. One, some, or all functions of the detector 40 other than those of the detection circuit 48 are also included in the control circuit 102.

The detection control circuit 11 is a circuit that supplies respective control signals to the first gate line drive circuit 15A, the second gate line drive circuit 15B, the signal line selection circuit 16, and the detector 40 to control operations thereof. The detection control circuit 11 supplies various control signals including, for example, a synchronization signal STV and a clock signal CK to the first gate line drive circuit 15A and the second gate line drive circuit 15B. The detection control circuit 11 also supplies various control signals including, for example, a signal line selection signal ASW to the signal line selection circuit 16 during a detection period for performing detection processing. In the present disclosure, the detection control circuit 11 also supplies various control signals including, for example, a differential input switching signal SSW to the detection circuit 48 through a detection timing control circuit 47 described later during the detection period for performing the detection processing.

The first gate line drive circuit 15A and the second gate line drive circuit 15B are circuits that drive a plurality of gate lines (read control scan lines GLrd and reset control scan lines GLrst (refer to FIG. 5)) based on the various control signals. The first gate line drive circuit 15A and the second gate line drive circuit 15B sequentially or simultaneously select the gate lines, and supply the gate drive signals (for example, the reset control signals RST or the read control signals RD) to the selected gate lines. Through this operation, the first gate line drive circuit 15A and the second gate line drive circuit 15B select the photoelectric conversion elements 30 coupled to the gate lines.

Figure 5:
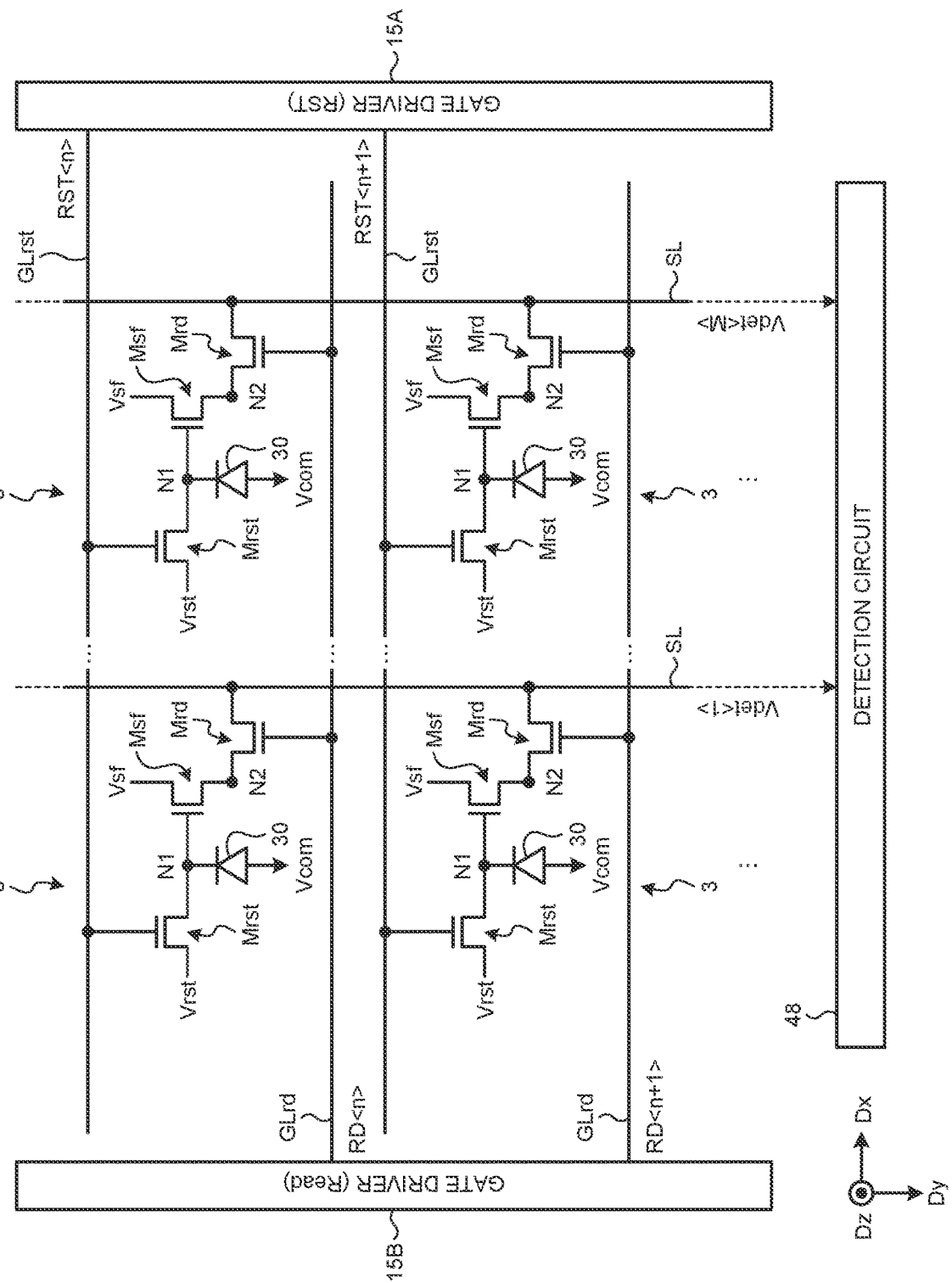
FIG. 5 is a circuit diagram illustrating a plurality of detection elements.

The signal line selection circuit 16 is a switch circuit that sequentially or simultaneously selects a plurality of output signal lines SL (refer to FIG. 5). The signal line selection circuit 16 is, for example, a multiplexer. The signal line selection circuit 16 electrically couples the selected output signal lines SL to the detection circuit 48 based on the signal line selection signal ASW supplied from the detection control circuit 11. Through this operation, the signal line selection circuit 16 outputs the detection signals Vdet from the detection elements 3 to the detector 40. The signal line selection circuit 16 may be omitted. In this case, the output signal lines SL may be directly coupled to the detection circuit 48.

The detector 40 includes the detection circuit 48, a signal processing circuit 44, a coordinate extraction circuit 45, a storage circuit 46, and the detection timing control circuit 47.

In the present disclosure, the detector 40 is a circuit that detects the asperities on the surface of the object to be detected, such as the fingerprint of the finger Fg, and the biological information on, for example, the vein in the finger based on a control signal supplied from the detection control circuit 11 and the detection signals Vdet supplied from the detection elements 3.

The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 amplifies the detection signal Vdet. The A/D conversion circuit 43 converts an analog signal output from the detection signal amplifying circuit 42 into a digital signal. In the present disclosure, the detection signal amplifying circuit 42 of the detection circuit 48 is an analog circuit that includes a differential amplifier circuit described later, and the circuits at the subsequent stages of the A/D conversion circuit 43 are digital signal processing circuits that process digital data converted by the A/D conversion circuit 43.

The signal processing circuit 44 is a logic circuit that detects a predetermined physical quantity received by the sensor area 10 based on output signals of the detection circuit 48. The signal processing circuit 44 performs predetermined processing on the output signals of the detection circuit 48.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of, for example, the asperities on the surface of the object to be detected, such as the finger Fg. Specifically, the coordinate extraction circuit 45 generates, for example, two-dimensional information (such as an image) representing the shape of the asperities on the surface of the detected object, such as the finger Fg. In an aspect of the present disclosure, the coordinate extraction circuit 45 may obtain the detected coordinates of, for example, a blood vessel of the finger Fg or a palm.

The following describes a circuit configuration example and an operation example of the detection device 1. FIG. 5 is a circuit diagram illustrating the detection elements. As illustrated in FIG. 5, each of the detection elements 3 includes the photoelectric conversion element 30, a reset transistor Mrst, a read transistor Mrd, and a source follower transistor Msf. The detection elements 3 are provided with the reset control scan lines GLrst and the read control scan lines GLrd as detection drive lines (gate lines), and provided with the output signal lines SL as wiring for reading signals.

The reset control scan lines GLrst, the read control scan lines GLrd, and the output signal lines SL are each coupled to the detection elements 3. Specifically, the reset control scan lines GLrst and the read control scan lines GLrd extend in the first direction Dx (refer to FIG. 3), and are each coupled to the detection elements 3 arranged in the first direction Dx. The output signal lines SL extend in the second direction Dy, and are each coupled to the detection elements 3 arranged in the second direction Dy. The output signal lines SL are wiring from which signals from the transistors (read transistors Mrd and source follower transistors Msf) are output.

The reset transistor Mrst, the read transistor Mrd, and the source follower transistor Msf are provided correspondingly to each of the photoelectric conversion elements 30. Each of the transistors included in the detection element 3 is constituted by an n-type thin-film transistor (TFT). However, each of the transistors is not limited thereto, and may be constituted by a p-type TFT.

The common voltage Vcom is applied to the anode of the photoelectric conversion element 30. The cathode of the photoelectric conversion element 30 is coupled to a node N1. The node N1 is coupled to one of the source and the drain of the reset transistor Mrst, and to the gate of the source follower transistor Msf. When light irradiates the photoelectric conversion element 30, a signal (electric charge) output from the photoelectric conversion element 30 is stored in a capacitive element generated at the node N1.

The gate of the reset transistor Mrst is coupled to a corresponding one of the reset control scan lines GLrst. The other of the source and the drain of the reset transistor Mrst is supplied with a reset voltage Vrst. When the reset transistor Mrst is turned on (into a conduction state) in response to the reset control signal RST supplied from the first gate line drive circuit 15A, the voltage of the node N1 is reset to the reset voltage Vrst. The common voltage Vcom has a voltage lower than the reset voltage Vrst, and the photoelectric conversion element 30 is driven in a reverse bias state.

The source follower transistor Msf is coupled between a terminal supplied with the power supply voltage Vsf and the read transistor Mrd (node N2). The gate of the source follower transistor Msf is coupled to the node N1. The gate of the source follower transistor Msf is supplied with a signal (voltage) corresponding to the signal (electric charge) generated by the photoelectric conversion element 30. This operation causes the source follower transistor Msf to output a signal voltage corresponding to the signal (electric charge) generated by the photoelectric conversion element 30 to the read transistor Mrd.

The read transistor Mrd is coupled between the source of the source follower transistor Msf (node N2) and a corresponding one of the output signal lines SL. The gate of the read transistor Mrd is coupled to a corresponding one of the read control scan lines GLrd. When the read transistor Mrd is turned on in response to the read control signal RD supplied from the second gate line drive circuit 15B, the signal output from the source follower transistor Msf, that is, the signal (voltage) corresponding to the signal (electric charge) generated by the photoelectric conversion element 30 is output as the detection signal Vdet to the output signal line SL.

In FIG. 5, the reset transistor Mrst and the read transistor Mrd each have a single-gate structure. However, the reset transistor Mrst and the read transistor Mrd may each have what is called a double-gate structure constituted by two transistors coupled in series, or may have a configuration constituted by three or more transistors coupled in series. The circuit of each of the detection elements 3 is not limited to the configuration including the three transistors of the reset transistor Mrst, the source follower transistor Msf, and the read transistor Mrd. The detection element 3 may have two transistors or four or more transistors.

Figure 6:
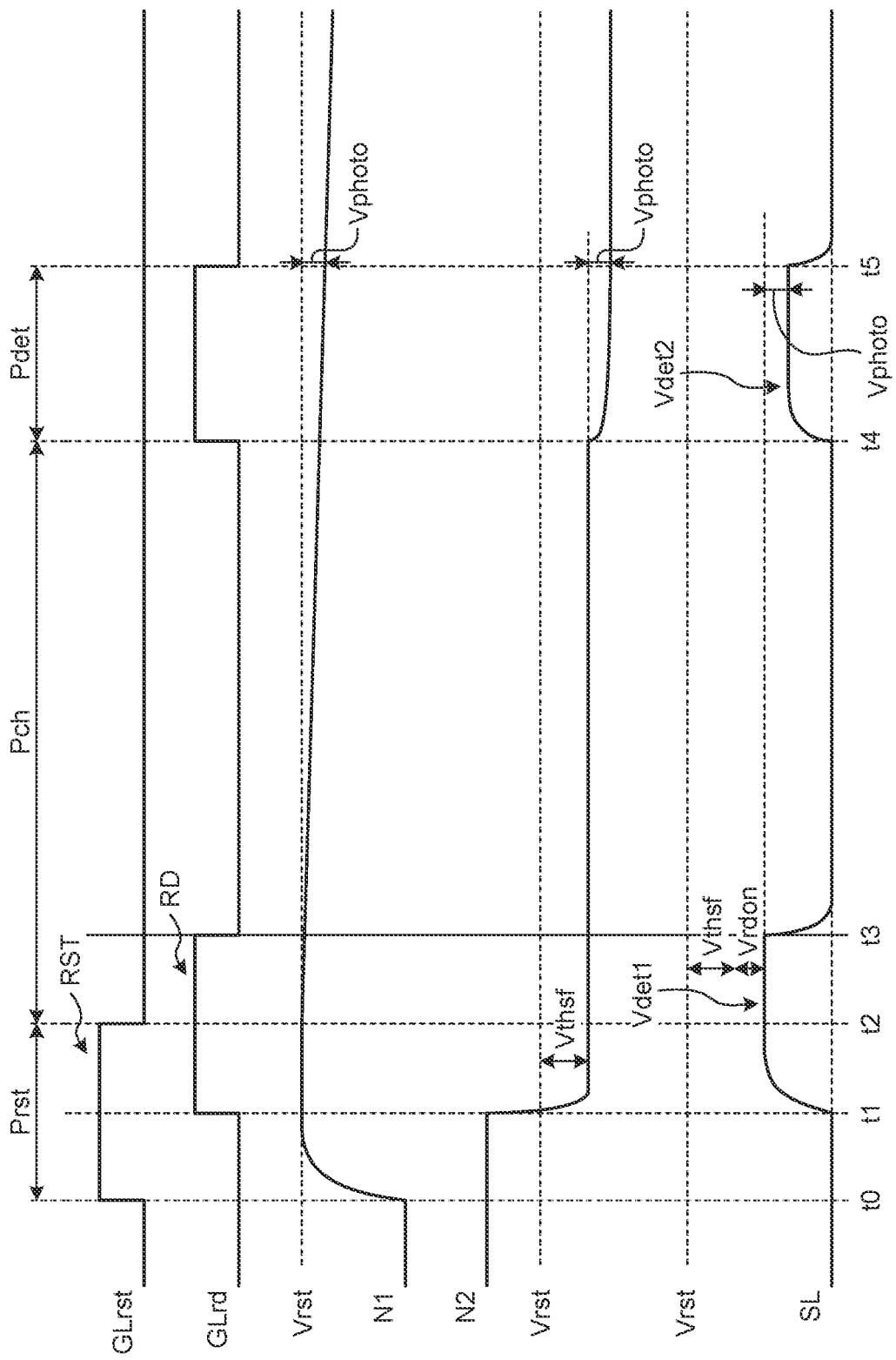
FIG. 6 is a timing waveform diagram illustrating an operation example of each of the detection elements in a detection period.

FIG. 6 is a timing waveform diagram illustrating an operation example of the detection element during the detection period. As illustrated in FIG. 6, the detection element 3 performs the detection in the order of a reset period Prst, an exposure period Pch, and a read period Pdet during the detection period. The power supply circuit 103 supplies the common voltage Vcom to the anode of the photoelectric conversion element 30 over the reset period Prst, the exposure period Pch, and the read period Pdet.

At time t0, the detection control circuit 11 sets the reset control signal RST supplied to the reset control scan line GLrst to HIGH (high-level voltage) to start the reset period Prst. In the reset period Prst, the reset transistor Mrst is turned on (into the conduction state) to increase the voltage of the node N1 to the reset voltage Vrst. As a result, the photoelectric conversion element 30 is reverse-biased by a potential difference between the reset voltage Vrst and the common voltage Vcom. Since the read transistor Mrd is off (in a nonconduction state), the source of the source follower transistor Msf is charged by the power supply voltage Vsf to increase the voltage of the node N2.

At time t1, the detection control circuit 11 sets the read control signal RD supplied to the read control scan line GLrd to HIGH (high-level voltage). As a result, the read transistor Mrd is turned on (into the conduction state) to set the voltage of the node N2 to (Vrst-Vthsf). Vthsf denotes a threshold voltage Vthsf of the source follower transistor Msf.

At time t2, the detection control circuit 11 sets the reset control signal RST to LOW (low-level voltage) to end the reset period Prst and start the exposure period Pch. In the exposure period Pch, the reset transistor Mrst is turned off (into the nonconduction state). The signal corresponding to the light irradiating the photoelectric conversion element 30 is stored to reduce the voltage of the node N1 to (Vrst-Vphoto). Specifically, during the reset period Prst, for example, an electric charge stored in a self-capacitor or a non-illustrated capacitor in the photoelectric conversion element 30 is discharged by the light irradiation, and a signal corresponding to the irradiating light is stored. Vphoto denotes a signal (voltage change amount) corresponding to the light irradiating the photoelectric conversion element 30.

At time t3, the voltage of a detection signal Vdet1 output from the output signal line SL is set to (Vrst-Vthsf-Vrdon). Vrdon denotes a voltage drop caused by on-resistance of the read transistor Mrd.

At time t3, the detection control circuit 11 sets the read control signal RD to LOW (low-level voltage). As a result, the read transistor Mrd is turned off (into the nonconduction state) to set the voltage of the node N2 to be constant at (Vrst-Vthsf). The output signal line SL is loaded so as to output the detection signal Vdet having a voltage at LOW (low-level voltage).

At time t4, the detection control circuit 11 sets the read control signal RD to HIGH (high-level voltage). As a result, the read transistor Mrd is turned on (into the conduction state) after the exposure period Pch ends, and the read period Pdet starts. The voltage of the node N2 changes to (Vrst-Vthsf-Vphoto) according to the signal Vphoto. The voltage of a detection signal Vdet2 output in the read period Pdet decreases by an amount of the signal Vphoto from the voltage of the detection signal Vdet1 obtained at time t3, and thus, is set to (Vrst-Vthsf-Vrdon-Vphoto).

The detector 40 can detect the light irradiating the photoelectric conversion element 30 based on the potential difference (Vphoto) between the detection signal Vdet1 detected in the reset period Prst and the detection signal Vdet2 detected in the read period Pdet. While FIG. 6 illustrates the operation example of one of the detection elements 3, the first gate line drive circuit 15A and the second gate line drive circuit 15B can sequentially scan the reset control scan lines GLrst and the read control scan lines GLrd, respectively, in a time-division manner to cause the detection elements 3 in the entire detection area AA to perform the detection. While FIG. 6 illustrates the example of detecting the light irradiating the photoelectric conversion element 30 based on the potential difference between the detection signal Vdet1 detected in the reset period Prst and the detection signal Vdet2 detected in the read period Pdet, the present disclosure is not limited to this example. In an aspect of the present disclosure, the voltage of the detection signal Vdet2 detected in the read period Pdet may be used to detect the light irradiating the photoelectric conversion element 30.

Figure 7:
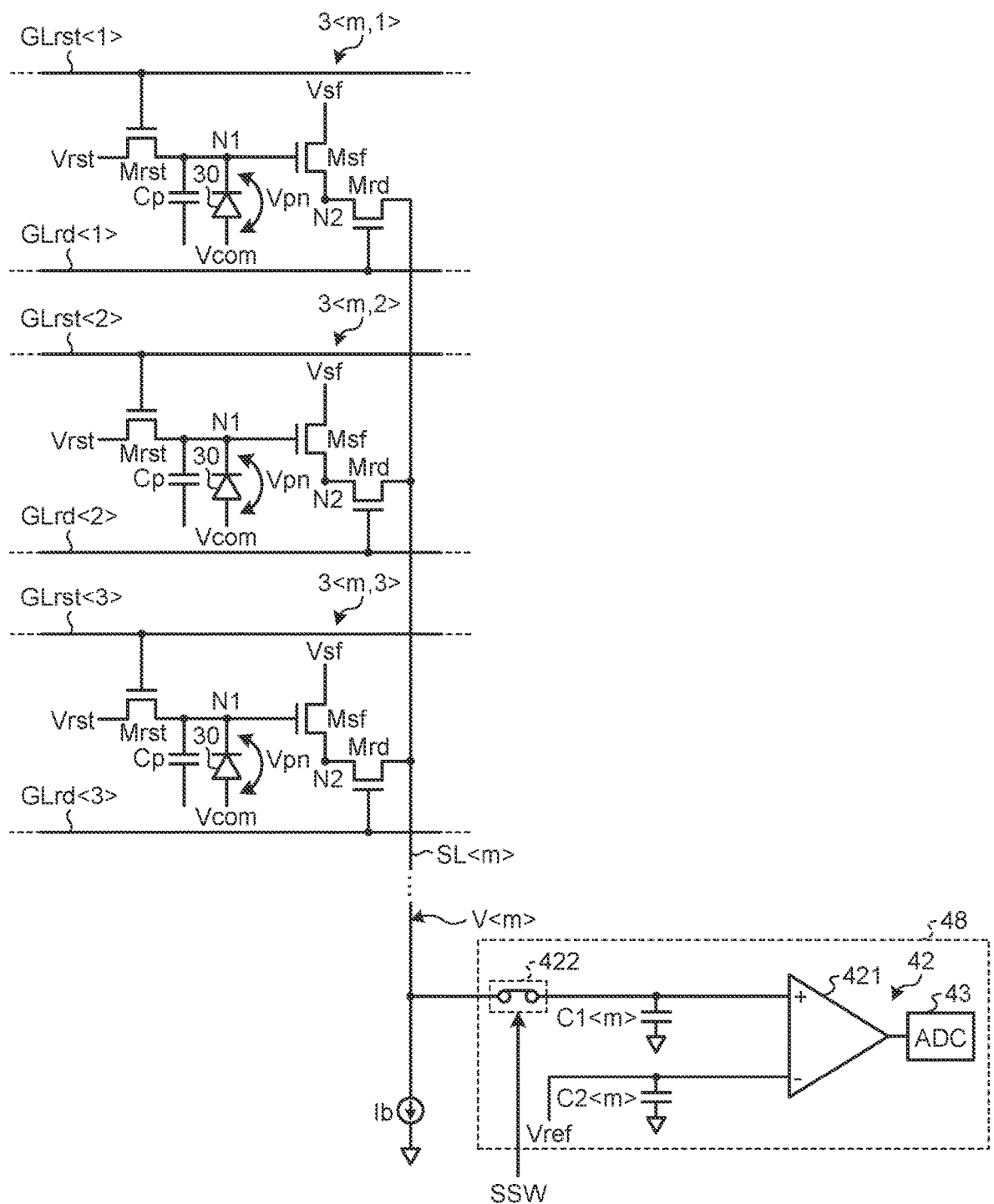
FIG. 7 is a diagram illustrating a coupling example between the detection elements and a detection circuit in the detection device according to a comparative example.

FIG. 7 is a diagram illustrating a coupling example between the detection elements and the detection circuit in the detection device according to a comparative example. In the following explanation, a parameter corresponding to the mth column and the nth row (where m is a natural number of M or smaller, and n is a natural number of N or smaller) is also denoted as "X<m, n>". A parameter corresponding to the mth column is also denoted as "X<m>". A parameter corresponding to the nth row is also denoted as "X<n>".

FIG. 7 illustrates a coupling example between the detection elements 3<m, 1>, 3<m, 2>, 3<m, 3>, . . . arranged in the mth column and the detection circuit 48 through the output signal line SL<m> in the mth column.

As described above, the photoelectric conversion element 30 is reverse-biased during the reset period Prst (refer to FIG. 6). At this time, a reverse-bias voltage Vpn that is the potential difference between the reset voltage Vrst and the common voltage Vcom is applied to the photoelectric conversion element 30.

The detection circuit 48 is coupled to a constant-current source for conducting a bias current Ib to the read transistor Mrd. This configuration enables detection of a detection voltage V<m> of the detection element 3 (the voltage of the detection signal Vdet1 detected in the reset period Prst and the voltage of the detection signal Vdet2 detected in the read period Pdet). This constant-current source may be provided in the detection circuit 48 or in the substrate 21. In FIG. 7, a capacity Cp can be a parasitic capacity of the photoelectric conversion element 30 or an individual capacitor outside the photoelectric conversion element 30.

The detection circuit 48 is coupled to the output signal line SL<m>. The detection signal amplifying circuit 42 of the detection circuit 48 outputs a voltage corresponding to a voltage of the output signal line SL<m> to the A/D conversion circuit 43.

Specifically, the detection signal amplifying circuit 42 includes a differential amplifier circuit 421, a first capacitive element C1<m> coupled to a non-inverting input terminal (+) of the differential amplifier circuit 421, and a second capacitive element C2<m> coupled to an inverting input terminal (−) of the differential amplifier circuit 421. In the comparative example, in the differential amplifier circuit 421, the detection voltage V<m> of the detection element 3 is applied to the non-inverting input terminal (+) through the output signal line SL<m>, and the first capacitive element C1<m> is charged with an electric charge corresponding to the detection voltage V<m>. In the differential amplifier circuit 421, a reference voltage Vref is applied to the inverting input terminal (−), and the second capacitive element C2<m> is charged with an electric charge corresponding to the reference voltage Vref.

Figure 8:
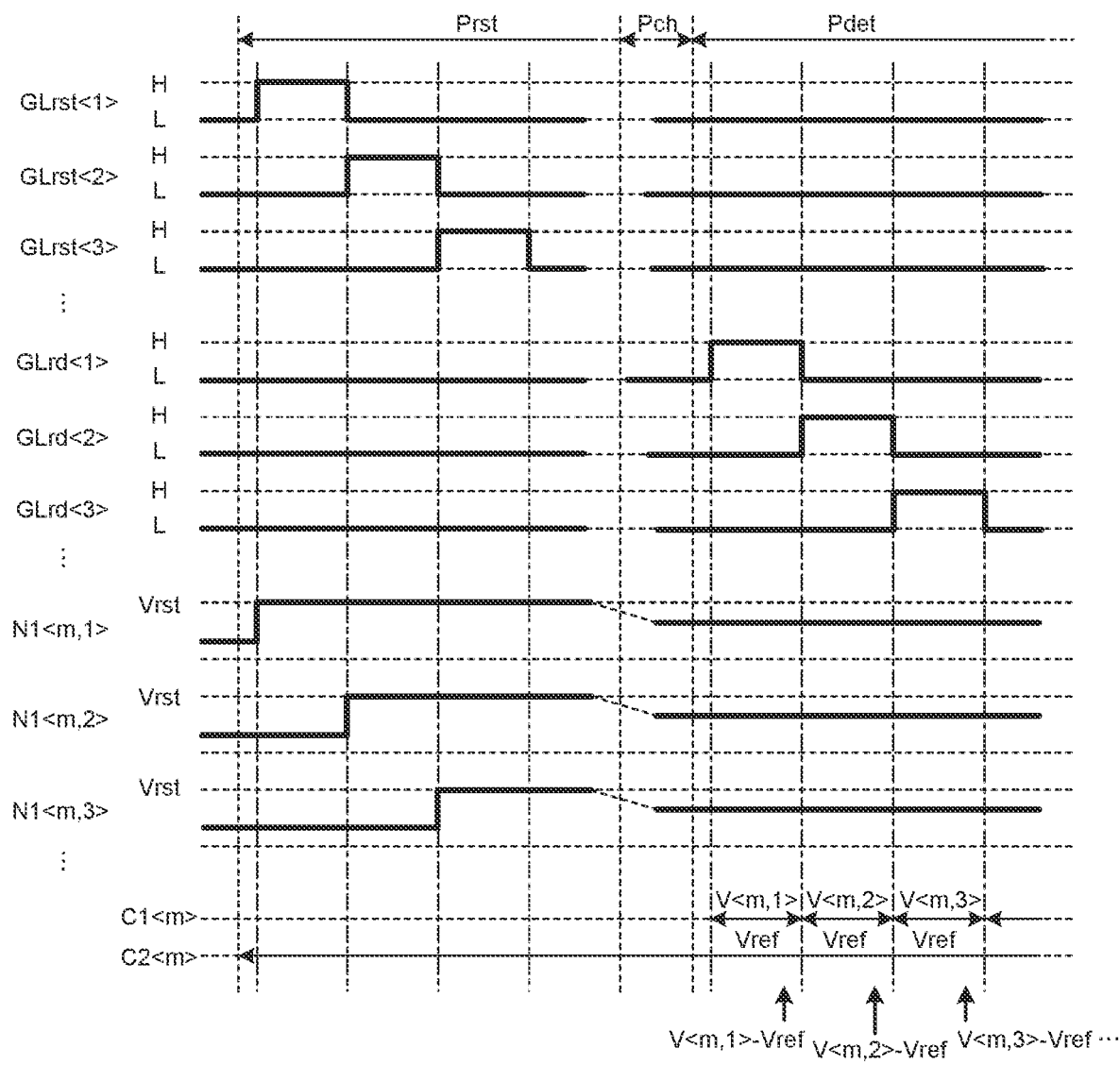
FIG. 8 is a diagram illustrating an exemplary timing diagram during a detection operation of the detection device according to the comparative example.

FIG. 8 is a diagram illustrating an exemplary timing diagram during the detection operation of the detection device according to the comparative example.

During the reset period Prst, the first gate line drive circuit 15A sequentially sets the reset control scan lines GLrst<1>, GLrst<2>, GLrst<3>, . . . to "H" (high-level voltage) based on the synchronization signal STV and the clock signal CK output from the detection control circuit 11. This operation sequentially turns on the reset transistor Mrst of each of the detection elements 3 (into the conduction state) to increase the voltage of the node N1 to the reset voltage Vrst. At this time, the photoelectric conversion element 30 is reverse-biased by the voltage difference between the reset voltage Vrst and the common voltage Vcom. Since the read transistor Mrd is off (in the nonconduction state), the source of the source follower transistor Msf is charged by the power supply voltage Vsf to increase the voltage of the node N2.

In the exposure period Pch after the reset period Prst, the voltage at the node N1 decreases according to the light irradiating the photoelectric conversion element 30.

In the read period Pdet after the exposure period Pch, the second gate line drive circuit 15B sequentially sets the read control scan lines GLrd<1>, GLrd<2>, GLrd<3>, . . . , to "H" (high-level voltage) based on the clock signal CK output from the detection control circuit 11. This operation sequentially turns on the read transistor Mrd of each of the detection elements 3 (into the conduction state) to charge the first capacitive element C1<m> with the electric charge corresponding to the detection voltage V<m> of the detection element 3 through the output signal line SL<m>.

In an "H" period of the read control scan line GLrd<m>, the A/D conversion circuit 43 converts a value obtained by using the differential amplifier circuit 421 to amplify a potential difference between the detection voltage V<m> that has charged the first capacitive element C1<m> and the reference voltage Vref that has charged the second capacitive element C2<m> into a digital signal.

Specifically, in the "H" period of the read control scan line GLrd<1>, the A/D conversion circuit 43 converts the potential difference between the detection voltage V<m, 1> that has charged the first capacitive element C1<m> and the reference voltage Vref that has charged the second capacitive element C2<m> into a digital signal.

In the "H" period of the read control scan line GLrd<2>, the A/D conversion circuit 43 converts the potential difference between the detection voltage V<m, 2> that has charged the first capacitive element C1<m> and the reference voltage Vref that has charged the second capacitive element C2<m> into a digital signal.

In the "H" period of the read control scan line GLrd<3>, the A/D conversion circuit 43 converts the potential difference between the detection voltage V<m, 3> that has charged the first capacitive element C1<m> and the reference voltage Vref that has charged the second capacitive element C2<m> into a digital signal.

Hereafter, in the same manner, the A/D conversion circuit 43 converts the potential difference between the detection voltage V<m, n> that has charged the first capacitive element C1<m> and the reference voltage Vref that has charged the second capacitive element C2<m> into a digital signal, in each "H" period of the read control scan line GLrd<n>.

Thus, by setting the sampling timing for obtaining the digital data corresponding to the detection element 3<m, n> in each "H" period of the read control scan line GLrd<n>, the digital data corresponding to the detection voltages at the detection elements 3<m, n> in the entire detection area AA can be obtained.

FIG. 9 is a chart illustrating examples of the digital data obtained during the detection operation of the detection device according to the comparative example. In FIG. 9, for example, the digital data corresponding to the detection voltage at the detection element 3<m, n> is denoted as "V<m, n>–Vref". This chart illustrates the digital data when the degree of amplification (Gain) of the differential amplifier circuit 421 is "1".

When the Gain (degree of amplification) of the differential amplifier circuit 421 is "k", the digital data corresponding to the detection element 3<m, n> is denoted as "k× (V<m, n>–Vref)". When detecting, for example, the fingerprint of the finger Fg or the information on the living body, the difference between the detection elements 3<m, n> needs to be detected accurately. However, in the comparative example, since the digital data corresponding to the detection voltage for each of the detection elements 3<m, n> is obtained, each piece of the digital data has a large data value. If the Gain (degree of amplification) of the differential amplifier circuit 421 is increased in order to accurately detect the difference in detection voltage between the detection elements 3<m, n>, a data overflow (digit overflow) may occur in the digital signal processing circuits (for example, the signal processing circuit 44 and the coordinate extraction circuit 45) at the subsequent stages, and the fingerprint detection accuracy may be reduced.

In the present disclosure, by obtaining the digital data corresponding to the potential difference in the detection voltage between the adjacent detection elements 3, the data value of each piece of the digital data is made smaller than that of the comparative example in which the digital data corresponding to the detection voltage for each of the detection elements 3<m, n> is obtained. This method can reduce the data overflow in the digital signal processing circuits (for example, the signal processing circuit 44 and the coordinate extraction circuit 45) at the subsequent stages, and can improve the fingerprint detection accuracy. The following describes a configuration and an operation for obtaining the digital data corresponding to the potential difference in the detection voltage between the adjacent detection elements 3.

First Embodiment

Figure 10:
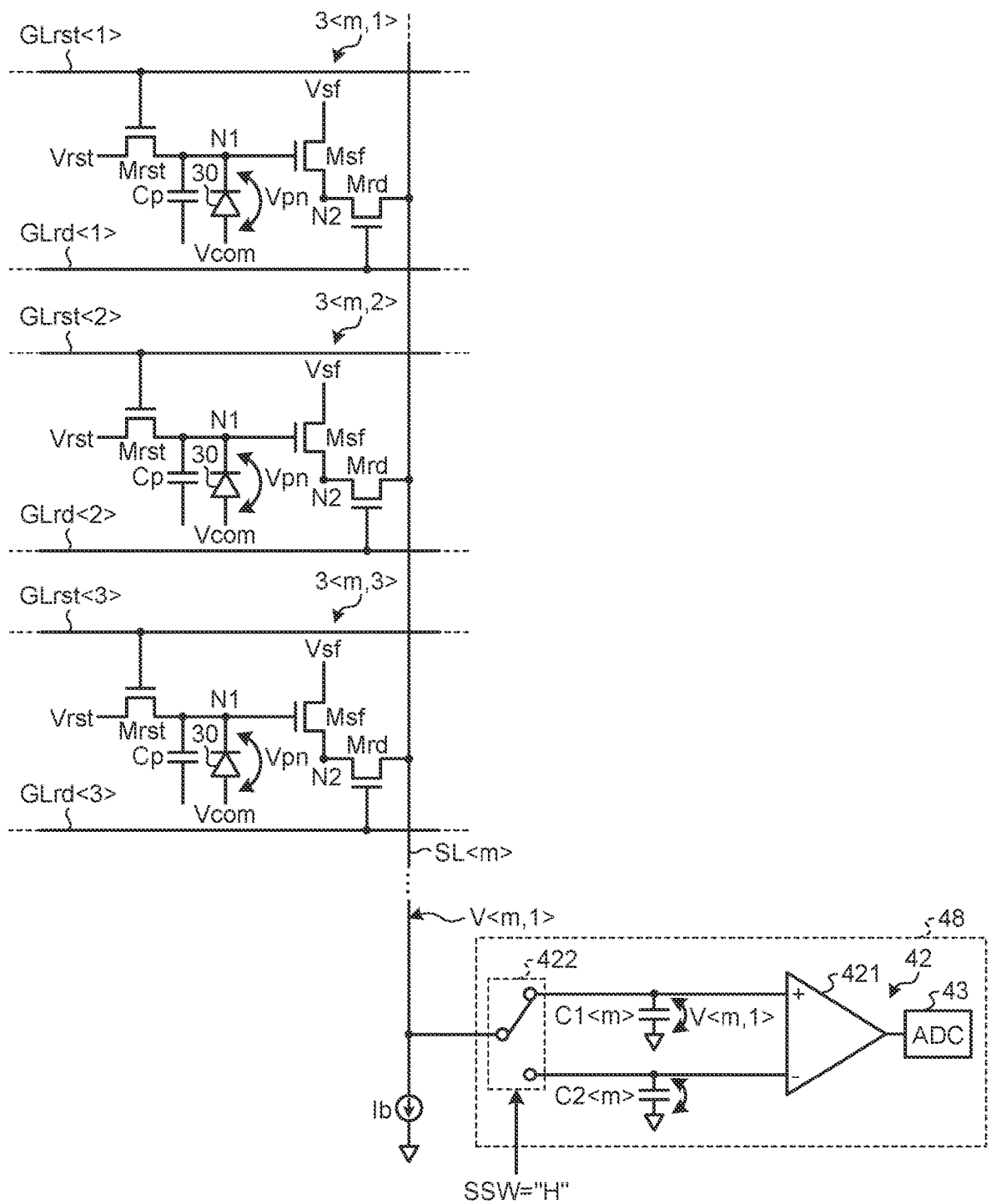
FIG. 10 is a diagram illustrating a coupling example between the detection elements and the detection circuit in the detection device according to a first embodiment of the present disclosure.
Figure 11:
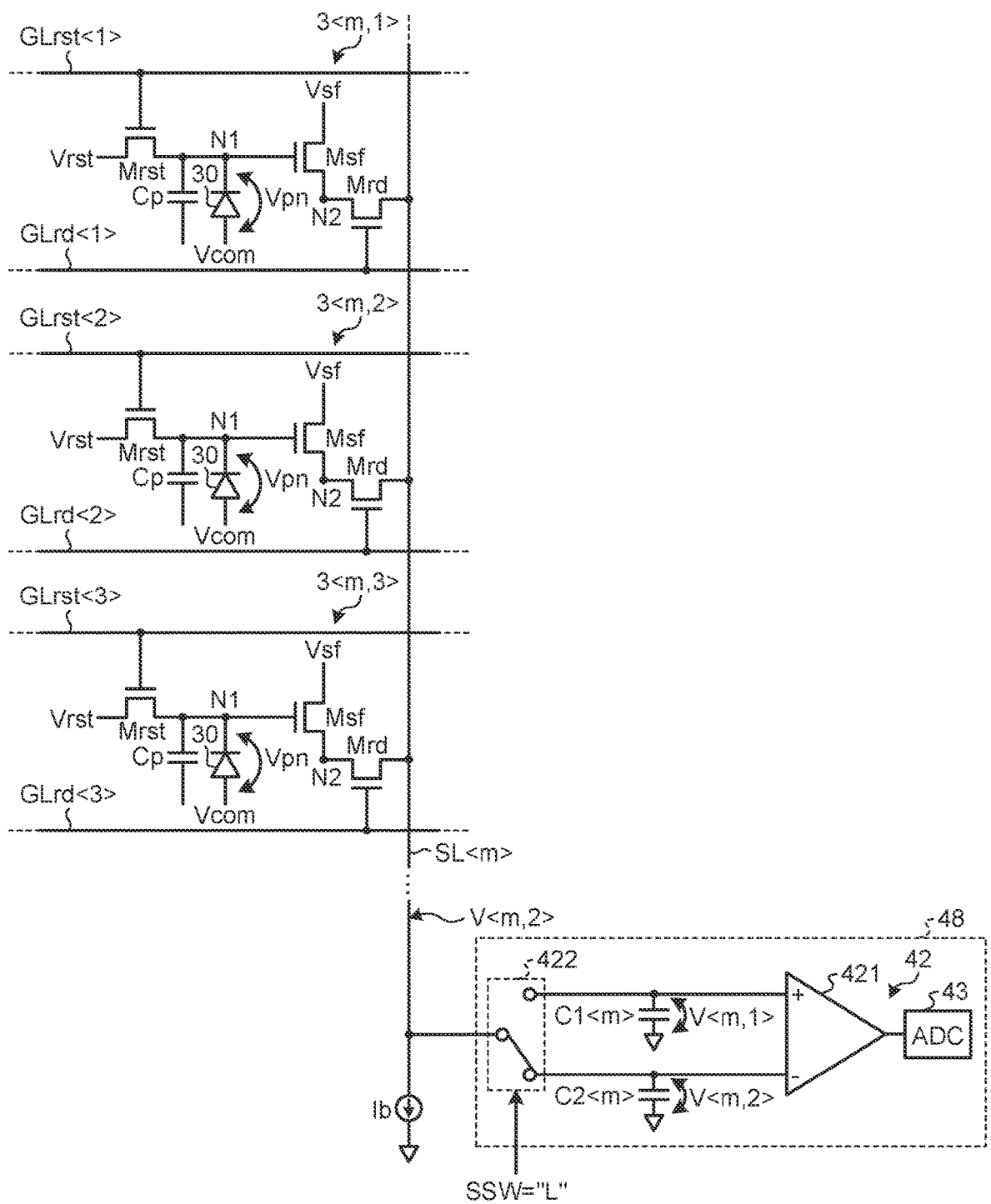
FIG. 11 is a diagram illustrating another coupling example between the detection elements and the detection circuit in the detection device according to the first embodiment.
Figure 12:
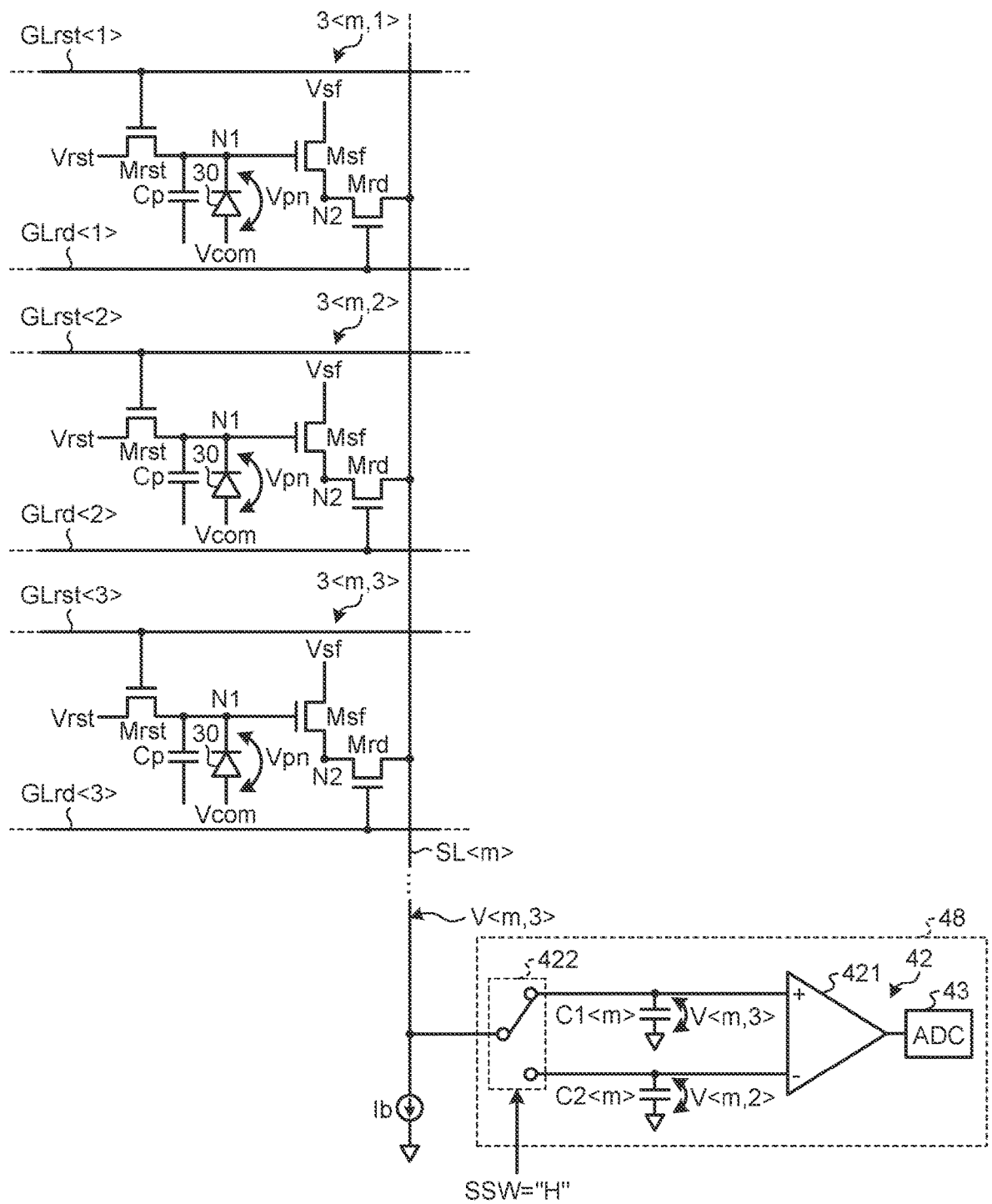
FIG. 12 is a diagram illustrating still another coupling example between the detection elements and the detection circuit in the detection device according to the first embodiment.
Figure 13:
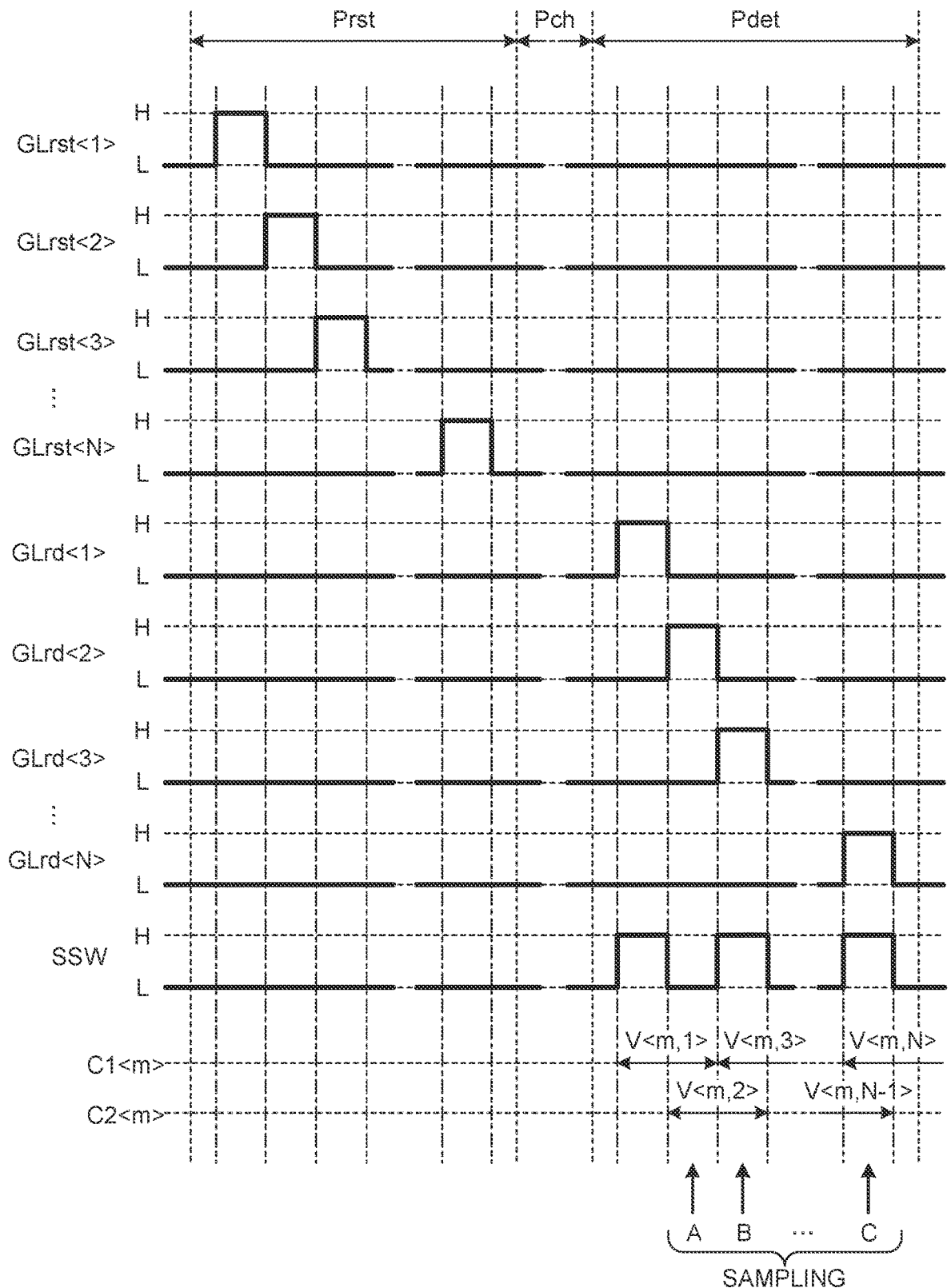
FIG. 13 is a diagram illustrating an exemplary timing diagram during the detection operation of the detection device according to the first embodiment.

FIGS. 10, 11, and 12 are diagrams illustrating coupling examples between the detection elements and the detection circuit in the detection device according to a first embodiment of the present disclosure. FIG. 13 is a diagram illustrating an exemplary timing diagram during the detection operation of the detection device according to the first embodiment. FIG. 10 illustrates a coupling example in the "H" period of the read control scan line GLrd<1> illustrated in FIG. 13. FIG. 11 illustrates a coupling example in the "H" period of the read control scan line GLrd<2> illustrated in FIG. 13. FIG. 12 illustrates a coupling example in the "H" period of the read control scan line GLrd<3> illustrated in FIG. 13. Components having the same functions as those in the comparative example described above are denoted by the same reference numerals, and will not be described.

The detection signal amplifying circuit 42 according to the first embodiment includes the differential amplifier circuit 421, the first capacitive element C1<m> coupled to the non-inverting input terminal (+) of the differential amplifier circuit 421, the second capacitive element C2<m> coupled to the inverting input terminal (−) of the differential amplifier circuit 421, and a switch circuit 422 that applies the detection voltage V<m> received through the output signal line SL<m> to one of the non-inverting input terminal (+) and the inverting input terminal (−) of the differential amplifier circuit 421.

In the first embodiment, in the differential amplifier circuit 421, the detection voltage V<m, odd> of the detection element 3<m, odd> in an odd-numbered row is applied to the non-inverting input terminal (+) through the switch circuit 422, and the first capacitive element C1<m> is charged with an electric charge corresponding to the detection voltage V<m, odd>. In the differential amplifier circuit 421, the detection voltage V<m, even> of the detection element 3<m, even> in an even-numbered row is applied to the inverting input terminal (−) through the switch circuit 422, and the second capacitive element C2<m> is charged with an electric charge corresponding to the detection voltage V<m, even>.

The detection control circuit 11 switches the control state of the switch circuit 422 in synchronization with the read control scan line GLrd<m>. This operation electrically couples the output signal line SL<m> to one of the non-inverting input terminal (+) and the inverting input terminal (−) of the differential amplifier circuit 421.

Specifically, for example, in the "H" (high-level voltage) period of the read control scan line GLrd<odd> in the odd-numbered row, the detection control circuit 11 sets the differential input switching signal SSW to "H" (high-level voltage), and performs control to apply the detection voltage V<m, odd> of the detection element 3<m, odd> in the odd-numbered row to the non-inverting input terminal (+) of the differential amplifier circuit 421.

For example, in the "H" (high-level voltage) period of the read control scan line GLrd<even> in the even-numbered row, the detection control circuit 11 sets the differential input switching signal SSW to "L" (low-level voltage), and performs control to apply the detection voltage V<m, even> of the detection element 3<m, even> in the even-numbered row to the inverting input terminal (−) of the differential amplifier circuit 421.

In the "H" period of the read control scan line GLrd<m>, the A/D conversion circuit 43 converts a value obtained by using the differential amplifier circuit 421 to amplify a potential difference between the detection voltage V<m, odd> that has charged the first capacitive element C1<m> and the detection voltage V<m, even> that has charged the second capacitive element C2<m> into a digital signal.

Specifically, the differential input switching signal SSW is controlled to be "H" in the "H" period of the read control scan line GLrd<1>. This operation charges the first capacitive element C1<m> with an electric charge corresponding to the detection voltage V<m, 1> of the detection element 3<m, 1>.

In the subsequent "H" period of the read control scan line GLrd<2>, the differential input switching signal SSW is controlled to be "L". This operation charges the second capacitive element C2<m> with an electric charge corresponding to the detection voltage V<m, 2> of the detection element 3<m, 2>. At this time, the electric charge that has charged the first capacitive element C1<m> is being held.

In this "H" period of the read control scan line GLrd<2>, more specifically, at sampling time A illustrated in FIG. 13, the A/D conversion circuit 43 converts the potential difference between the detection voltage V<m, 1> that has charged the first capacitive element C1<m> and the detection voltage V<m, 2> that has charged the second capacitive element C2<m> into a digital signal.

In the subsequent "H" period of the read control scan line GLrd<3>, the differential input switching signal SSW is controlled to be "H". This operation charges the first capacitive element C1<m> with an electric charge corresponding to the detection voltage V<m, 3> of the detection element 3<m, 3>. At this time, the electric charge that has charged the second capacitive element C2<m> is being held.

In this "H" period of the read control scan line GLrd<3>, more specifically, at sampling time B illustrated in FIG. 13, the A/D conversion circuit 43 converts the potential difference between the detection voltage V<m, 3> that has charged the first capacitive element C1<m> and the detection voltage V<m, 2> that has charged the second capacitive element C2<m> into a digital signal.

In an aspect of the present disclosure, the digital data obtained at sampling time B is preferably data obtained by applying sign inversion to the digitalized data in the digital signal processing circuit (for example, the signal processing circuit 44) at the subsequent stage.

Hereafter, in the same manner, the A/D conversion circuit 43 converts the potential difference between the detection voltage V<m, odd> that has charged the first capacitive element C1<m> and the detection voltage V<m, even> that has charged the second capacitive element C2<m> into a digital signal, in each "H" period of the read control scan line GLrd<n>. Then, at sampling time C illustrated in FIG. 13, the A/D conversion circuit 43 converts the potential difference between the detection voltage V<m, n> that has charged the first capacitive element C1<m> and the detection voltage V<m, N−1> that has charged the second capacitive element C2<m> into a digital signal.

By performing the operation described above for all the output signal lines SL<m>, the digital data can be obtained that corresponds to the potential difference in the detection voltage between two of the detection elements 3 adjacent in the second direction Dy.

FIG. 14 is a chart illustrating a correspondence relation of the digital data obtained at each sampling time in the timing diagram illustrated in FIG. 13. FIG. 15 is a chart illustrating examples of the digital data obtained during the detection operation of the detection device according to the first embodiment. FIG. 15 illustrates the digital data when the Gain (degree of amplification) of the differential amplifier circuit 421 is "1". In FIG. 15, for example, the digital data corresponding to the potential difference between the detection element 3<m, n> and the detection element 3<m, n+1> is denoted as "V<m, n>−V<m, n+1>".

When the Gain (degree of amplification) of the differential amplifier circuit 421 is "k", the digital data corresponding to the potential difference between the detection element 3<m, n> and the detection element 3<m, n+1> is denoted as "k×(V<m, n>−V<m, n+1>)". The digital data obtained by the configuration and the operation of the first embodiment described above is the digital data corresponding to the potential difference in the detection voltage between two of the detection elements 3 adjacent in the second direction Dy, and therefore, is relatively smaller in value than the digital data obtained by the configuration and the operation of the comparative example illustrated in FIGS. 7 and 8. As a result, the Gain (degree of amplification) of the differential amplifier circuit 421 can be made larger than that in the comparative example without causing a data overflow (digit overflow) in the digital signal processing circuits (for example, the signal processing circuit 44 and the coordinate extraction circuit 45) at the subsequent stages. Consequently, more accurate fingerprint detection than in the comparative example can be achieved. In the configuration of the first embodiment, the number of data in the column direction (second direction Dy, that is, the vertical direction illustrated in FIG. 15) is N−1.

Figure 16:
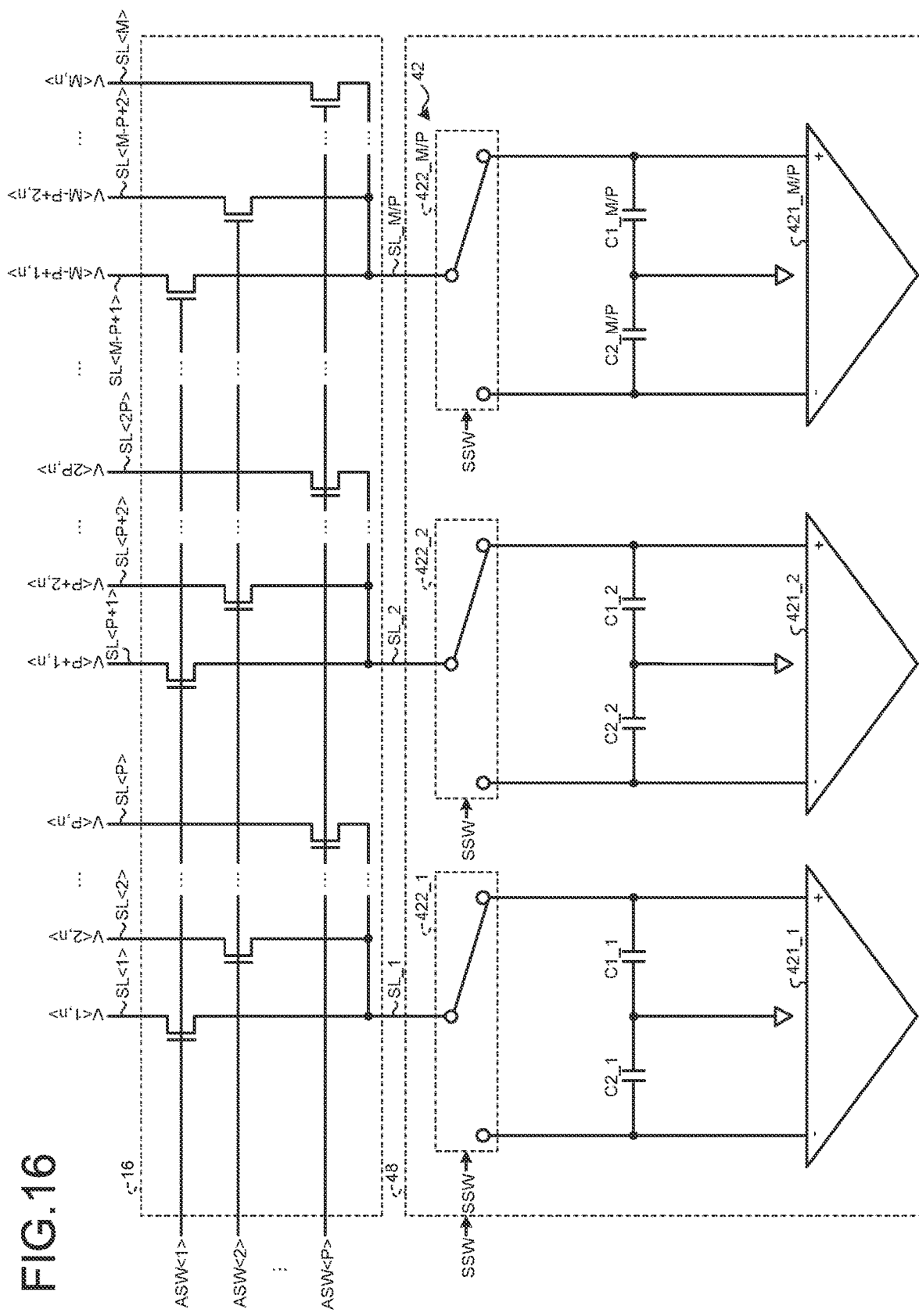
FIG. 16 is a diagram illustrating a configuration example of a signal line selection circuit and the detection circuit according to the first embodiment.
Figure 17:
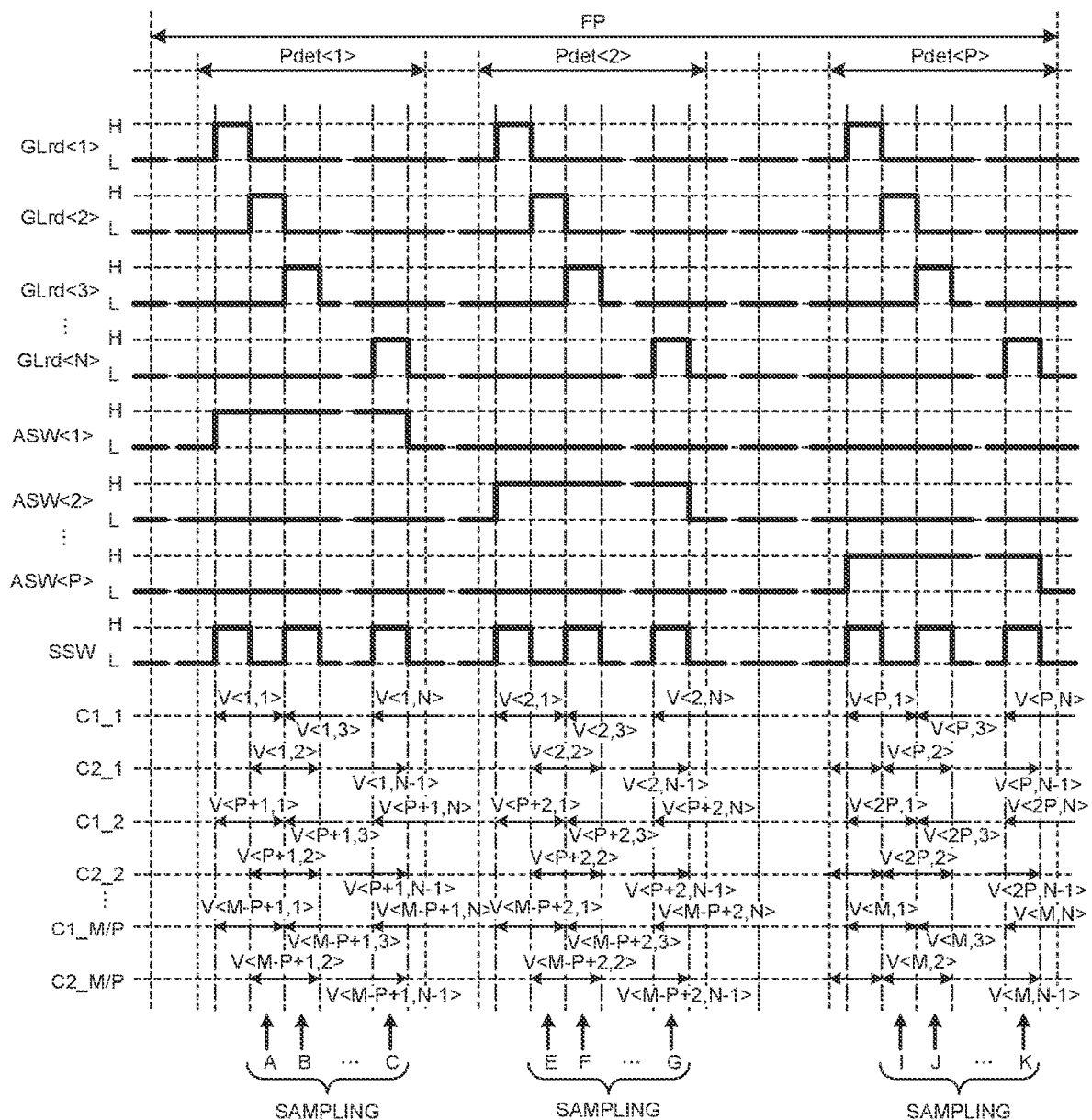
FIG. 17 is a diagram illustrating an exemplary timing diagram during the detection operation of the signal line selection circuit and the detection circuit according to the first embodiment.

The following describes a more specific configuration example and the operation of the detection device 1 according to the first embodiment. FIG. 16 is a diagram illustrating a configuration example of the signal line selection circuit and the detection circuit according to the first embodiment. FIG. 17 is a diagram illustrating an exemplary timing diagram during the detection operation of the signal line selection circuit and the detection circuit according to the first embodiment. FIG. 17 does not illustrate the reset period Prst and the exposure period Pch.

In the example illustrated in FIGS. 16 and 17, the signal line selection circuit 16 simultaneously selects the output signal lines SL<p>, SL<P+p>, . . . , SL<M−P+p> (where p is a natural number of P or smaller) based on the signal line selection signals ASW<1>, ASW<2>, . . . , ASW<P> (where P is a natural number of M/2 or smaller) supplied from the detection control circuit 11, and electrically couples the selected output signal lines SL to the detection circuit 48. In the example illustrated in FIGS. 16 and 17, one of the differential amplifier circuits 421_1, 421_2, . . . , 421_M/P is provided for the output signal lines SL<p>, SL<P+p>, . . . , SL<M−P+p> that are simultaneously selected by the signal line selection circuit 16.

The switch circuits 422_1, 422_2, . . . , 422_M/P of the detection circuit 48 apply the detection voltage V<m, n> received through the signal line selection circuit 16 to the non-inverting input terminals (+) or the inverting input terminals (−) of the differential amplifier circuits 421_1, 421_2, . . . , 421_M/P based on the differential input switching signal SSW supplied from the detection control circuit 11 through the detection timing control circuit 47.

In the read period Pdet<p>, the detection control circuit 11 sets the signal line selection signal ASW<p> to "H" (high-level voltage). In the "H" period of each of the signal line selection signals ASW<p>, the second gate line drive circuit 15B sequentially selects the read control scan lines GLrd<1>, GLrd<2>, GLrd<3>, . . . , GLrd<N>, and supplies the read control signal RD to the selected read control scan lines GLrd. This operation supplies the detection voltage V<m, n> of the detection element 3<m, n> to the detection circuit 48.

In the read period Pdet<1>, the detection circuit 48 obtains the digital data corresponding to the potential difference between the detection voltages of the detection element 3<1, n> and the detection element 3<1, n+1> that are coupled to the output signal line SL<1>.

Specifically, the differential input switching signal SSW is controlled to be "H" during the "H" period of the read control scan line GLrd<1> in the read period Pdet<1>. This operation charges the first capacitive element C1_1 with an electric charge corresponding to the detection voltage V<1, 1> of the detection element 3<1, 1>, charges the first capacitive element C1_2 with an electric charge corresponding to the detection voltage V<P+1, 1> of the detection element 3<P+1, 1>, and charges the first capacitive element C1_M/P with an electric charge corresponding to the detection voltage V<M−P+1, 1> of the detection element 3<M−P+1, 1>.

In the subsequent "H" period of the read control scan line GLrd<2>, the differential input switching signal SSW is controlled to be "L". This operation charges the second capacitive element C2_1 with an electric charge corresponding to the detection voltage V<1, 2> of the detection element 3<1, 2>, charges the second capacitive element C2_2 with an electric charge corresponding to the detection voltage V<P+1, 2> of the detection element 3<P+1, 2>, and charges the second capacitive element C2_M/P with an electric charge corresponding to the detection voltage V<M−P+1, 2> of the detection element 3<M−P+1, 2>. At this time, the electric charges that have charged the first capacitive elements C1_1, C1_2, . . . , C1_M/P are being held.

During this "H" period of the read control scan line GLrd<2> in the read period Pdet<1>, more specifically, at sampling time A illustrated in FIG. 17, the A/D conversion circuit 43 converts the potential difference between the detection voltage V<1, 1> that has charged the first capacitive element C1_1 and the detection voltage V<1, 2> that has charged the second capacitive element C2_1 into a digital signal, converts the potential difference between the detection voltage V<P+1, 1> of the detection element 3<P+1, 1> that has charged the first capacitive element C1_2 and the detection voltage V<P+1, 2> of the detection element 3<P+1, 2> that has charged the second capacitive element C2_2 into a digital signal, and converts the potential difference between the detection voltage V<M−P+1, 1> of the detection element 3<M−P+1, 1> that has charged the first capacitive element C1_M/P and the detection voltage V<M−P+1, 2> of the detection element 3<M−P+1, 2> that has charged the second capacitive element C2_M/P into a digital signal.

In the subsequent "H" period of the read control scan line GLrd<3>, the differential input switching signal SSW is controlled to be "H". This operation charges the first capacitive element C1_1 with an electric charge corresponding to the detection voltage V<1, 3> of the detection element 3<1, 3>, charges the first capacitive element C1_2 with an electric charge corresponding to the detection voltage V<P+1, 3> of the detection element 3<P+1, 3>, and charges the first capacitive element C1_M/P with an electric charge corresponding to the detection voltage V<M−P+1, 3> of the detection element 3<M−P+1, 3>. At this time, the electric charges that have charged the second capacitive elements C2_1, C2_2, . . . , C2_M/P are being held.

During this "H" period of the read control scan line GLrd<3> in the read period Pdet<1>, more specifically, at sampling time B illustrated in FIG. 17, the A/D conversion circuit 43 converts the potential difference between the detection voltage V<1, 3> that has charged the first capacitive element C1_1 and the detection voltage V<1, 2> that has charged the second capacitive element C2_1 into a digital signal, converts the potential difference between the detection voltage V<P+1, 3> of the detection element 3<P+1, 3> that has charged the first capacitive element C1_2 and the detection voltage V<P+1, 2> of the detection element 3<P+1, 2> that has charged the second capacitive element C2_2 into a digital signal, and converts the potential difference between the detection voltage V<M−P+1, 3> of the detection element 3<M−P+1, 3> that has charged the first capacitive element C1_M/P and the detection voltage V<M−P+1, 2> of the detection element 3<M−P+1, 2> that has charged the second capacitive element C2_M/P into a digital signal. The digital signal processing circuit (for example, the signal processing circuit 44) at the subsequent stage inverts the signs of the digitalized data.

The differential input switching signal SSW is controlled to be "H" during the "H" period of the read control scan line GLrd<N> in the read period Pdet<1>. This operation charges the first capacitive element C1_1 with an electric charge corresponding to the detection voltage V<1, N> of the detection element 3<1, N>, charges the first capacitive element C1_2 with an electric charge corresponding to the detection voltage V<P+1, N> of the detection element 3<P+1, N>, and charges the first capacitive element C1_M/P with an electric charge corresponding to the detection voltage V<M−P+1, N> of the detection element 3<M−P+1, N>. At this time, the electric charges that have charged the second capacitive elements C2_1, C2_2, . . . , C2_M/P are being held.

During this "H" period of the read control scan line GLrd<N> in the read period Pdet<1>, more specifically, at sampling time C illustrated in FIG. 17, the A/D conversion circuit 43 converts the potential difference between the detection voltage V<1, N> that has charged the first capacitive element C1_1 and the detection voltage V<1, N−1> that has charged the second capacitive element C2_1 into a digital signal, converts the potential difference between the detection voltage V<P+1, N> of the detection element 3<P+1, N> that has charged the first capacitive element C1_2 and the detection voltage V<P+1, N−1> of the detection element 3<P+1, N−1> that has charged the second capacitive element C2_2 into a digital signal, and converts the potential difference between the detection voltage V<M−P+1, N> of the detection element 3<M−P+1, N> that has charged the first capacitive element C1_M/P and the detection voltage V<M−P+1, N−1> of the detection element 3<M−P+1, N−1> that has charged the second capacitive element C2_M/P into a digital signal. The digital signal processing circuit (for example, the signal processing circuit 44) at the subsequent stage inverts the signs of the digitalized data.

In the read period Pdet<2>, the detection circuit 48 obtains the digital data corresponding to the potential difference between the detection voltages of the detection element 3<2, n> and the detection element 3<2, n+1> that are coupled to the output signal line SL<2>.

Specifically, the differential input switching signal SSW is controlled to be "H" during the "H" period of the read control scan line GLrd<1> in the read period Pdet<2>. This operation charges the first capacitive element C1_1 with an electric charge corresponding to the detection voltage V<2, 1> of the detection element 3<2, 1>, charges the first capacitive element C1_2 with an electric charge corresponding to the detection voltage V<P+2, 1> of the detection element 3<P+2, 1>, and charges the first capacitive element C1_M/P with an electric charge corresponding to the detection voltage V<M−P+2, 1> of the detection element 3<M−P+2, 1>.

In the subsequent "H" period of the read control scan line GLrd<2>, the differential input switching signal SSW is controlled to be "L". This operation charges the second capacitive element C2_1 with an electric charge corresponding to the detection voltage V<2, 2> of the detection element 3<2, 2>, charges the second capacitive element C2_2 with an electric charge corresponding to the detection voltage V<P+2, 2> of the detection element 3<P+2, 2>, and charges the second capacitive element C2_M/P with an electric charge corresponding to the detection voltage V<M−P+2, 2> of the detection element 3<M−P+2, 2>. At this time, the electric charges that have charged the first capacitive elements C1_1, C1_2, . . . , C1_M/P are being held.

During this "H" period of the read control scan line GLrd<2> in the read period Pdet<2>, more specifically, at sampling time E illustrated in FIG. 17, the A/D conversion circuit 43 converts the potential difference between the detection voltage V<2, 1> that has charged the first capacitive element C1_1 and the detection voltage V<2, 2> that has charged the second capacitive element C2_1 into a digital signal, converts the potential difference between the detection voltage V<P+2, 1> of the detection element 3<P+2, 1> that has charged the first capacitive element C1_2 and the detection voltage V<P+2, 2> of the detection element 3<P+2, 2> that has charged the second capacitive element C2_2 into a digital signal, and converts the potential difference between the detection voltage V<M−P+2, 1> of the detection element 3<M−P+2, 1> that has charged the first capacitive element C1_M/P and the detection voltage V<M−P+2, 2> of the detection element 3<M−P+2, 2> that has charged the second capacitive element C2_M/P into a digital signal.

In the subsequent "H" period of the read control scan line GLrd<3>, the differential input switching signal SSW is controlled to be "H". This operation charges the first capacitive element C1_1 with an electric charge corresponding to the detection voltage V<2, 3> of the detection element 3<2, 3>, charges the first capacitive element C1_2 with an electric charge corresponding to the detection voltage V<P+2, 3> of the detection element 3<P+2, 3>, and charges the first capacitive element C1_M/P with an electric charge corresponding to the detection voltage V<M−P+2, 3> of the detection element 3<M−P+2, 3>. At this time, the electric charges that have charged the second capacitive elements C2_1, C2_2, . . . , C2_M/P are being held.

During this "H" period of the read control scan line GLrd<3> in the read period Pdet<2>, more specifically, at sampling time F illustrated in FIG. 17, the A/D conversion circuit 43 converts the potential difference between the detection voltage V<2, 3> that has charged the first capacitive element C1_1 and the detection voltage V<2, 2> that has charged the second capacitive element C2_1 into a digital signal, converts the potential difference between the detection voltage V<P+2, 3> of the detection element 3<P+2, 3> that has charged the first capacitive element C1_2 and the detection voltage V<P+2, 2> of the detection element 3<P+2, 2> that has charged the second capacitive element C2_2 into a digital signal, and converts the potential difference between the detection voltage V<M−P+2, 3> of the detection element 3<M−P+2, 3> that has charged the first capacitive element C1_M/P and the detection voltage V<M−P+2, 2> of the detection element 3<M−P+2, 2> that has charged the second capacitive element C2_M/P into a digital signal. The digital signal processing circuit (for example, the signal processing circuit 44) at the subsequent stage inverts the signs of the digitalized data.

The differential input switching signal SSW is controlled to be "H" during the "H" period of the read control scan line GLrd<N> in the read period Pdet<2>. This operation charges the first capacitive element C1_1 with an electric charge corresponding to the detection voltage V<2, N> of the detection element 3<2, N>, charges the first capacitive element C1_2 with an electric charge corresponding to the detection voltage V<P+2, N> of the detection element 3<P+2, N>, and charges the first capacitive element C1_M/P with an electric charge corresponding to the detection voltage V<M−P+2, N> of the detection element 3<M−P+2, N>. At this time, the electric charges that have charged the second capacitive elements C2_1, C2_2, . . . , C2_M/P are being held.

During this "H" period of the read control scan line GLrd<N> in the read period Pdet<2>, more specifically, at sampling time G illustrated in FIG. 17, the A/D conversion circuit 43 converts the potential difference between the detection voltage V<2, N> that has charged the first capacitive element C1_1 and the detection voltage V<2, N−1> that has charged the second capacitive element C2_1 into a digital signal, converts the potential difference between the detection voltage V<P+2, N> of the detection element 3<P+2, N> that has charged the first capacitive element C1_2 and the detection voltage V<P+2, N−1> of the detection element 3<P+2, N−1> that has charged the second capacitive element C2_2 into a digital signal, and converts the potential difference between the detection voltage V<M−P+2, N> of the detection element 3<M−P+2, N> that has charged the first capacitive element C1_M/P and the detection voltage V<M−P+2, N−1> of the detection element 3<M−P+2, N−1> that has charged the second capacitive element C2_M/P into a digital signal. The digital signal processing circuit (for example, the signal processing circuit 44) at the subsequent stage inverts the signs of the digitalized data.

In the read period Pdet<P>, the detection circuit 48 obtains the digital data corresponding to the potential difference between the detection voltages of the detection element 3<P, n> and the detection element 3<P, n+1> that are coupled to the output signal line SL<P>.

Specifically, the differential input switching signal SSW is controlled to be "H" during the "H" period of the read control scan line GLrd<1> in the read period Pdet<P>. This operation charges the first capacitive element C1_1 with an electric charge corresponding to the detection voltage V<P, 1> of the detection element 3<P, 1>, charges the first capacitive element C1_2 with an electric charge corresponding to the detection voltage V<2P, 1> of the detection element 3<2P, 1>, and charges the first capacitive element C1_M/P with an electric charge corresponding to the detection voltage V<M, 1> of the detection element 3<M, 1>.

In the subsequent "H" period of the read control scan line GLrd<2>, the differential input switching signal SSW is controlled to be "L". This operation charges the second capacitive element C2_1 with an electric charge corresponding to the detection voltage V<P, 2> of the detection element 3<P, 2>, charges the second capacitive element C2_2 with an electric charge corresponding to the detection voltage V<2P, 2> of the detection element 3<2P, 2>, and charges the second capacitive element C2_M/P with an electric charge corresponding to the detection voltage V<M, 2> of the detection element 3<M, 2>. At this time, the electric charges that have charged the first capacitive elements C1_1, C1_2, . . . , C1_M/P are being held.

During this "H" period of the read control scan line GLrd<2> in the read period Pdet<P>, more specifically, at sampling time I illustrated in FIG. 17, the A/D conversion circuit 43 converts the potential difference between the detection voltage V<P, 1> that has charged the first capacitive element C1_1 and the detection voltage V<P, 2> that has charged the second capacitive element C2_1 into a digital signal, converts the potential difference between the detection voltage V<2P, 1> of the detection element 3<2P, 1> that has charged the first capacitive element C1_2 and the detection voltage V<2P, 2> of the detection element 3<2P, 2> that has charged the second capacitive element C2_2 into a digital signal, and converts the potential difference between the detection voltage V<M, 1> of the detection element 3<M, 1> that has charged the first capacitive element C1_M/P and the detection voltage V<M, 2> of the detection element 3<M, 2> that has charged the second capacitive element C2_M/P into a digital signal.

In the subsequent "H" period of the read control scan line GLrd<3>, the differential input switching signal SSW is controlled to be "H". This operation charges the first capacitive element C1_1 with an electric charge corresponding to the detection voltage V<P, 3> of the detection element 3<P, 3>, charges the first capacitive element C1_2 with an electric charge corresponding to the detection voltage V<2P, 3> of the detection element 3<2P, 3>, and charges the first capacitive element C1_M/P with an electric charge corresponding to the detection voltage V<M, 3> of the detection element 3<M, 3>. At this time, the electric charges that have charged the second capacitive elements C2_1, C2_2, . . . , C2_M/P are being held.

During this "H" period of the read control scan line GLrd<3> in the read period Pdet<P>, more specifically, at sampling time J illustrated in FIG. 17, the A/D conversion circuit 43 converts the potential difference between the detection voltage V<P, 3> that has charged the first capacitive element C1_1 and the detection voltage V<P, 2> that has charged the second capacitive element C2_1 into a digital signal, converts the potential difference between the detection voltage V<2P, 3> of the detection element 3<2P, 3> that has charged the first capacitive element C1_2 and the detection voltage V<2P, 2> of the detection element 3<2P, 2> that has charged the second capacitive element C2_2 into a digital signal, and converts the potential difference between the detection voltage V<M, 3> of the detection element 3<M, 3> that has charged the first capacitive element C1_M/P and the detection voltage V<M, 2> of the detection element 3<M, 2> that has charged the second capacitive element C2_M/P into a digital signal. The digital signal processing circuit (for example, the signal processing circuit 44) at the subsequent stage inverts the signs of the digitalized data.

The differential input switching signal SSW is controlled to be "H" during the "H" period of the read control scan line GLrd<N> in the read period Pdet<P>. This operation charges the first capacitive element C1_1 with an electric charge corresponding to the detection voltage V<P, N> of the detection element 3<P, N>, charges the first capacitive element C1_2 with an electric charge corresponding to the detection voltage V<2P, N> of the detection element 3<2P, N>, and charges the first capacitive element C1_M/P with an electric charge corresponding to the detection voltage V<M, N> of the detection element 3<M, N>. At this time, the electric charges that have charged the second capacitive elements C2_1, C2_2, . . . , C2_M/P are being held.

During this "H" period of the read control scan line GLrd<N> in the read period Pdet<P>, more specifically, at sampling time K illustrated in FIG. 17, the A/D conversion circuit 43 converts the potential difference between the detection voltage V<P, N> that has charged the first capacitive element C1_1 and the detection voltage V<P, N−1> that has charged the second capacitive element C2_1 into a digital signal, converts the potential difference between the detection voltage V<2P, N> of the detection element 3<2P, N> that has charged the first capacitive element C1_2 and the detection voltage V<2P, N−1> of the detection element 3<2P, N−1> that has charged the second capacitive element C2_2 into a digital signal, and converts the potential difference between the detection voltage V<M, N> of the detection element 3<M, N> that has charged the first capacitive element C1_M/P and the detection voltage V<M, N−1> of the detection element 3<M, N−1> that has charged the second capacitive element C2_M/P into a digital signal. The digital signal processing circuit (for example, the signal processing circuit 44) at the subsequent stage inverts the signs of the digitalized data.

Thus, with the configuration illustrated in FIG. 16, the digital data corresponding to the potential difference in the detection voltage between two of the detection elements 3 adjacent in the second direction Dy can be obtained by repeating the combination of the reset period Prst, the exposure period Pch, and the read period Pdet for P cycles during a detection period FP.

FIG. 18 is a chart illustrating a correspondence relation of the digital data obtained at each sampling time in the timing diagram illustrated in FIG. 17. FIG. 19 is a chart illustrating examples of the digital data obtained during the detection operation of the signal line selection circuit and the detection circuit according to the first embodiment.

FIG. 19 illustrates the digital data when the Gain (degree of amplification) of the differential amplifier circuit 421 is "1". In FIG. 19, for example, the digital data corresponding to the potential difference between the detection element 3<m, n> and the detection element 3<m, n+1> is denoted as "V<m, n>−V<m, n+1>". In the present embodiment, the digital data corresponding to the potential difference in the detection voltage between two of the detection elements 3 adjacent in the second direction Dy is obtained by the configuration and the operation described above. Therefore, the number of the data in the column direction (second direction Dy, that is, the vertical direction illustrated in FIG. 19) is N−1 that is smaller by 1 than the number N of the detection elements 3 arranged in the column direction (second direction Dy).

The signal processing circuit 44 sequentially stores the digital data obtained in the detection period FP as first detection values ΔV<m, n> in the storage circuit 46.

After the detection period FP ends, the signal processing circuit 44 performs predetermined processing on the first detection values ΔV<m, n> stored in the storage circuit 46, and stores the results as second detection values V<m, n> in the storage circuit 46. The "predetermined processing" is, for example, processing to obtain an image corresponding to an image drawn based on the digital data for each of the detection elements obtained by the detection device according to the comparative example described above.

The coordinate extraction circuit 45 generates the two-dimensional information (such as the image) representing the shape of the asperities on the surface of the finger Fg or the like, based on the second detection values V<m, n> stored in the storage circuit 46. In an aspect of the present disclosure, the signal processing circuit 44 may read the second detection values V<m, n> from the storage circuit 46 and output them to the coordinate extraction circuit 45, or in another aspect, the coordinate extraction circuit 45 may directly read the second detection values V<m, n> from the storage circuit 46. In an alternative aspect, the second detection values V<m, n> may be calculated by the signal processing circuit 44 and directly output to the coordinate extraction circuit 45 without being stored in and read from the storage circuit 46.

Modification

Figure 20:
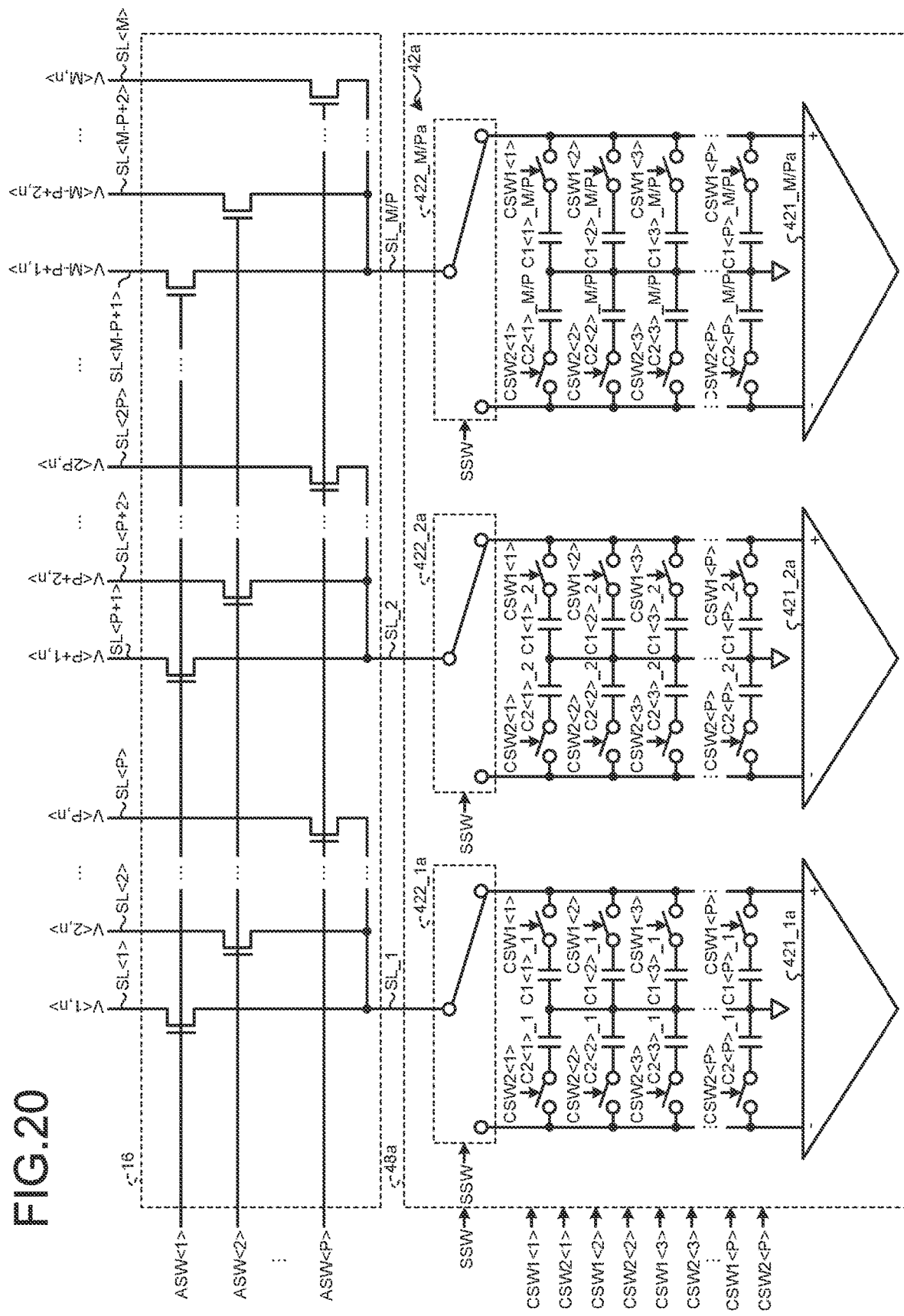
FIG. 20 is a diagram illustrating a configuration example of the signal line selection circuit and a detection circuit according to a modification of the first embodiment.
Figure 21:
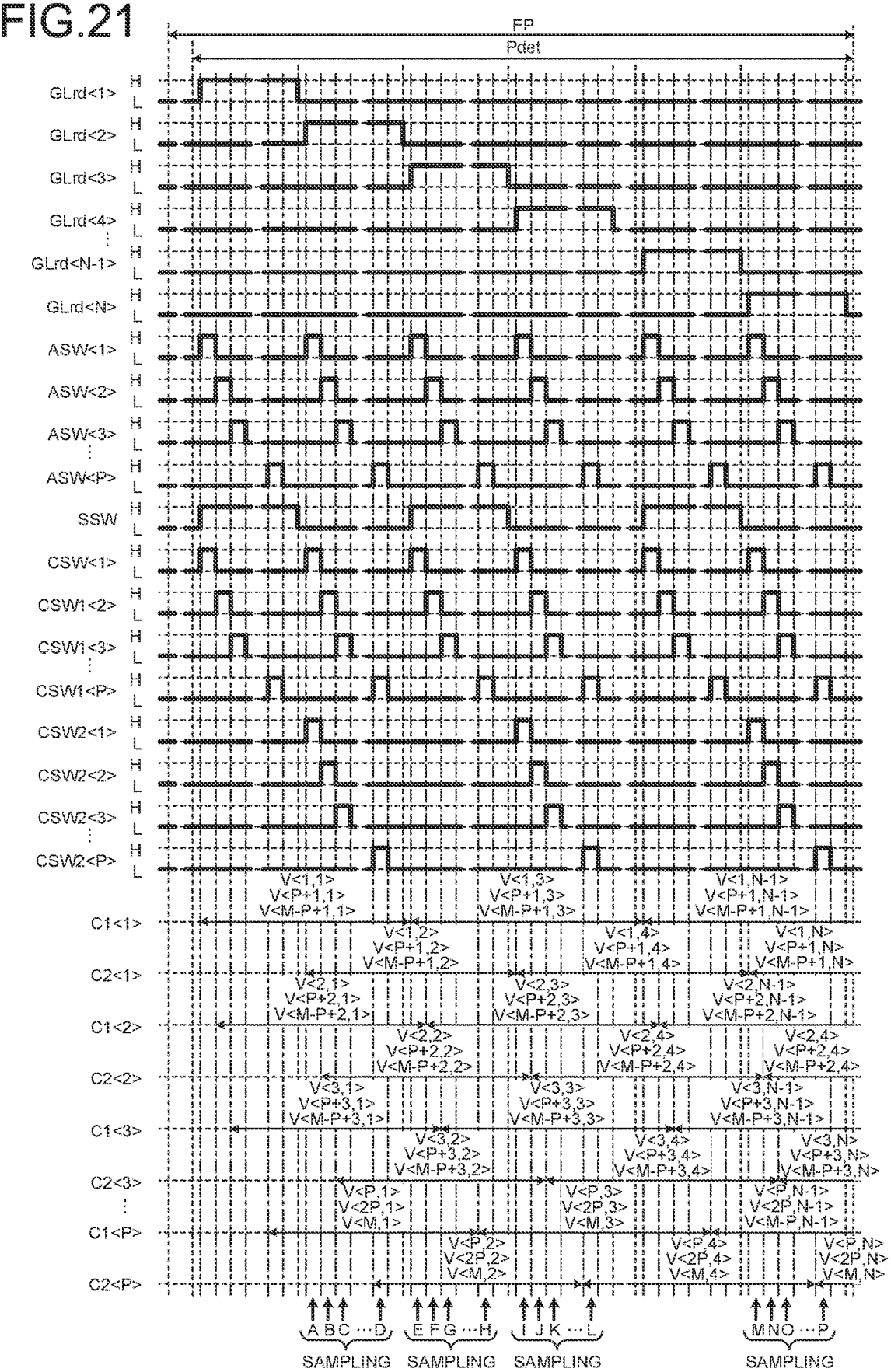
FIG. 21 is a diagram illustrating an exemplary timing diagram during the detection operation of the signal line selection circuit and the detection circuit according to the modification of the first embodiment.

FIG. 20 is a diagram illustrating a configuration example of the signal line selection circuit and a detection circuit according to a modification of the first embodiment. FIG. 21 is a diagram illustrating an exemplary timing diagram during the detection operation of the signal line selection circuit and the detection circuit according to the modification of the first embodiment. FIG. 22 is a chart illustrating a correspondence relation of the digital data obtained at each sampling time in the timing diagram illustrated in FIG. 21. FIG. 23 is a chart illustrating examples of the digital data obtained during the detection operation of the signal line selection circuit and the detection circuit according to the modification of the first embodiment. FIG. 21 does not illustrate the reset period Prst and the exposure period Pch.

A detection signal amplifying circuit 42a according to the modification of the first embodiment includes differential amplifier circuits 421_1a, 421_2a, . . . , 421_M/Pa, a plurality of first capacitive elements C1<p>_1, C1<p>_2, . . . , C1<p>_M/P coupled to the non-inverting input terminals (+) of the differential amplifier circuits 421_1a, 421_2a, . . . , 421_M/Pa, respectively, a plurality of second capacitive elements C2<p>_1, C2<p>_2, . . . , C2<p>_M/P coupled to the inverting input terminals (−) of the differential amplifier circuits 421_1a, 421_2a, . . . , 421_M/Pa, respectively, and switch circuits 422_1a, 422_2a, . . . , 422_M/Pa that apply the detection voltages V<m> received through the output signal lines SL<m> to the non-inverting input terminals (+) or the inverting input terminals (−) of the differential amplifier circuits 421_1a, 421_2a, . . . , 421_M/Pa. The first capacitive elements C1<p>_1, C1<p>_2, . . . , C1<p>_M/P are coupled in parallel to the non-inverting input terminals (+) of the differential amplifier circuits 421_1a, 421_2a, 421_M/Pa. The second capacitive elements C2<p>_1, C2<p>_2, . . . , C2<p>_M/P are coupled in parallel to the inverting input terminals (−) of the differential amplifier circuits 421_1a, 421_2a, . . . , 421_M/Pa.

In the example illustrated in FIGS. 20 and 21, the detection control circuit 11 divides the "H" (high-level voltage) period of the read control scan line GLrd<n> in the read period Pdet<P> into P periods (where P is an integer of 2 or larger), and sequentially sets the signal line selection signals ASW<1>, ASW<2>, . . . , ASW<P> to "H" (high-level voltage) during the "H" (high-level voltage) period of the read control scan line GLrd<n>.

As a result, during the "H" (high-level voltage) period (selection period) of the read control scan line GLrd<n>, the signal line selection circuit 16 sequentially selects the output signal lines SL electrically coupled to the differential amplifier circuits 421_1, 421_2, . . . , 421_M/P along the first direction Dx based on the signal line selection signals ASW<1>, ASW<2>, . . . , ASW<P> (where P is a natural number of M/2 or smaller) supplied from the detection control circuit 11, and electrically couples the selected output signal lines SL to the detection circuit 48. The first capacitive elements C1<p>_1, C1<p>_2, . . . , C1<p>_M/P are provided correspondingly to the output signal lines SL sequentially selected during the "H" (high-level voltage) period (selection period) of the read control scan line GLrd<n>. The second capacitive elements C2<p>_1, C2<p>_2, . . . , C2<p>_M/P are also provided correspondingly to the output signal lines SL sequentially selected during the "H" (high-level voltage) period (selection period) of the read control scan line GLrd<n>.

Based on the differential input switching signal SSW supplied from the detection control circuit 11 through the detection timing control circuit 47, the switch circuits 422_1a, 422_2a, . . . , 422_M/Pa of a detection circuit 48a applies the detection voltage V<m, n> received through the signal line selection circuit 16 to the non-inverting input terminals (+) or the inverting input terminals (−) of the differential amplifier circuits 421_1, 421_2, . . . , 421_M/P in synchronization with the read control scan lines GLrd<1>, GLrd<2>, GLrd<3>, . . . , GLrd<N> that are set to "H" (high-level voltage) based on the clock signal CK output from the detection control circuit 11.

Based on a capacitance switching signal CSW1<p> supplied from the detection control circuit 11 through the detection timing control circuit 47, each of the switch circuits provided between the non-inverting input terminals (+) of the differential amplifier circuits 421_1a, 421_2a, . . . , 421_M/Pa and the first capacitive elements C1<p>_1, C1<p>_2, . . . , C1<p>_M/P is controlled to be turned on in synchronization with the signal line selection signal ASW<p> supplied from the detection control circuit 11.

Based on a capacitance switching signal CSW2<p> supplied from the detection control circuit 11 through the detection timing control circuit 47, each of the switch circuits provided between the inverting input terminals (−) of the differential amplifier circuits 421_1a, 421_2a, . . . , 421_M/Pa and the second capacitive elements C2<p>_1, C2<p>_2, . . . , C2<p>_M/P is controlled to be turned on in synchronization with the signal line selection signal ASW<p> supplied from the detection control circuit 11 during the "L" period of the differential input switching signal SSW supplied from the detection control circuit 11 through the detection timing control circuit 47.

In the read period Pdet of the detection period FP, the second gate line drive circuit 15B sequentially selects the read control scan lines GLrd<1>, GLrd<2>, GLrd<3>, . . . , GLrd<N>, and supplies the read control signal RD to the selected read control scan lines GLrd. During the "H" period of each of the read control scan lines GLrd<1>, GLrd<2>, GLrd<3>, . . . , GLrd<N>, the detection control circuit 11 sequentially sets the signal line selection signals ASW<1>, ASW<2>, . . . , ASW<P> to "H" (high-level voltage).

In the "H" period of the differential input switching signal SSW in synchronization with the "H" period of the read control scan line GLrd<1>, when the signal line selection signals ASW<1>, ASW<2>, . . . , ASW<P> are sequentially set to "H" (high-level voltage), the capacitance switching signals CSW1<p> are sequentially set to "H" (high-level voltage) in synchronization with the signal line selection signals ASW<1>, ASW<2>, . . . , ASW<P>. This operation charges each of the first capacitive elements C1<p>_1, C1<p>_2, . . . , C1<p>_M/P with an electric charge corresponding to the detection voltage V<p, 1> of the detection element 3<p, 1>.

In the subsequent "L" period of the differential input switching signal SSW in synchronization with the "H" period of the read control scan line GLrd<2>, when the signal line selection signals ASW<1>, ASW<2>, . . . , ASW<P> are sequentially set to "H" (high-level voltage), the capacitance switching signals CSW2<p> are sequentially set to "H" (high-level voltage) in synchronization with the signal line selection signals ASW<1>, ASW<2>, . . . , ASW<P>. This operation charges each of the second capacitive elements C2<p>_1, C2<p>_2, . . . , C2<p>_M/P with an electric charge corresponding to the detection voltage V<p, 2> of the detection element 3<p, 2>. At this time, the electric charges that have charged the first capacitive elements C1<p>_1, C1<p>_2, . . . , C1<p>_M/P are being held.

In this "H" period of the read control scan line GLrd<2>, the capacitance switching signal CSW1<p> is set to "H" (high-level voltage) in synchronization with the capacitance switching signal CSW2<p>. As a result, the detection circuit 48a obtains the digital data corresponding to the potential differences between the detection voltages of the detection elements 3<p, 1> that have charged the first capacitive elements C1<p>_1, C1<p>_2, . . . , C1<p>_M/P and the detection voltages of the detection elements 3<p, 2> that have charged the second capacitive elements C2<p>_1, C2<p>_2, . . . , C2<p>_M/P.

Specifically, at sampling time A illustrated in FIG. 21, the A/D conversion circuit 43 converts the potential difference between the detection voltage V<1, 1> that has charged the first capacitive element C1<1>_1 and the detection voltage V<1, 2> that has charged the second capacitive element C2<1>_1 into a digital signal.

At sampling time B illustrated in FIG. 21, the A/D conversion circuit 43 converts the potential difference between the detection voltage V<2, 1> that has charged the first capacitive element C1<2>_1 and the detection voltage V<2, 2> that has charged the second capacitive element C2<2>_1 into a digital signal.

At sampling time C illustrated in FIG. 21, the A/D conversion circuit 43 converts the potential difference between the detection voltage V<3, 1> that has charged the first capacitive element C1<3>_1 and the detection voltage V<3, 2> that has charged the second capacitive element C2<3>_1 into a digital signal.

At sampling time D illustrated in FIG. 21, the A/D conversion circuit 43 converts the potential difference between the detection voltage V<P, 1> that has charged the first capacitive element C1<P>_1 and the detection voltage V<P, 2> that has charged the second capacitive element C2<P>_1 into a digital signal.

Specifically, at sampling time A illustrated in FIG. 21, the A/D conversion circuit 43 converts the potential difference between the detection voltage V<P+1, 1> that has charged the first capacitive element C1<1>_2 and the detection voltage V<P+1, 2> that has charged the second capacitive element C2<1>_2 into a digital signal.

At sampling time B illustrated in FIG. 21, the A/D conversion circuit 43 converts the potential difference between the detection voltage V<P+2, 1> that has charged the first capacitive element C1<2>_2 and the detection voltage V<P+2, 2> that has charged the second capacitive element C2<2>_2 into a digital signal.

At sampling time C illustrated in FIG. 21, the A/D conversion circuit 43 converts the potential difference between the detection voltage V<P+3, 1> that has charged the first capacitive element C1<3>_2 and the detection voltage V<P+3, 2> that has charged the second capacitive element C2<3>_2 into a digital signal.

At sampling time D illustrated in FIG. 21, the A/D conversion circuit 43 converts the potential difference between the detection voltage V<P, 1> that has charged the first capacitive element C1<P>_2 and the detection voltage V<P, 2> that has charged the second capacitive element C2<P>_2 into a digital signal.

Specifically, at sampling time A illustrated in FIG. 21, the A/D conversion circuit 43 converts the potential difference between the detection voltage V<M−P+1, 1> that has charged the first capacitive element C1<1> M/P and the detection voltage V<M−P+1, 2> that has charged the second capacitive element C2<1>_M/P into a digital signal.

At sampling time B illustrated in FIG. 21, the A/D conversion circuit 43 converts the potential difference between the detection voltage V<M−P+2, 1> that has charged the first capacitive element C1<2>_M/P and the detection voltage V<M−P+2, 2> that has charged the second capacitive element C2<2>_M/P into a digital signal.

At sampling time C illustrated in FIG. 21, the A/D conversion circuit 43 converts the potential difference between the detection voltage V<M−P+3, 1> that has charged the first capacitive element C1<3>_M/P and the detection voltage V<M−P+3, 2> that has charged the second capacitive element C2<3>_M/P into a digital signal.

At sampling time D illustrated in FIG. 21, the A/D conversion circuit 43 converts the potential difference between the detection voltage V<M, 1> that has charged the first capacitive element C1<P>_M/P and the detection voltage V<M, 2> that has charged the second capacitive element C2<P>_M/P into a digital signal.

In the "H" period of the differential input switching signal SSW in synchronization with the subsequent "H" period of the read control scan line GLrd<3>, when the signal line selection signals ASW<1>, ASW<2>, . . . , ASW<P> are sequentially set to "H" (high-level voltage), the capacitance switching signals CSW1<p> are sequentially set to "H" (high-level voltage) in synchronization with the signal line selection signals ASW<1>, ASW<2>, . . . , ASW<P>. This operation charges each of the first capacitive elements C1<p>_1, C1<p>_2, . . . , C1<p>_M/P with an electric charge corresponding to the detection voltage V<p, 3> of the detection element 3<p, 3>. At this time, the electric charges that have charged the second capacitive elements C2<p>_1, C2<p>_2, . . . , C2<p>_M/P are being held.

In this "H" period of the read control scan line GLrd<3>, the detection circuit 48a obtains the digital data corresponding to the potential differences between the detection voltages of the detection elements 3<p,3> that have charged the first capacitive elements C1<p>_1, C1<p>_2, . . . , C1<p>_M/P and the detection voltages of the detection elements 3<p, 2> corresponding to the electric charges held in the second capacitive elements C2<p>_1, C2<p>_2, . . . , C2<p>_M/P.

Specifically, at sampling time E illustrated in FIG. 21, the A/D conversion circuit 43 converts the potential difference between the detection voltage V<1, 3> that has charged the first capacitive element C1<1>_1 and the detection voltage V<1, 2> that has charged the second capacitive element C2<1>_1 into a digital signal. The digital signal processing circuit (for example, the signal processing circuit 44) at the subsequent stage inverts the signs of the digitalized data.

At sampling time F illustrated in FIG. 21, the A/D conversion circuit 43 converts the potential difference between the detection voltage V<2, 3> that has charged the first capacitive element C1<2>_1 and the detection voltage V<2, 2> that has charged the second capacitive element C2<2>_1 into a digital signal. The digital signal processing circuit (for example, the signal processing circuit 44) at the subsequent stage inverts the signs of the digitalized data.

At sampling time G illustrated in FIG. 21, the A/D conversion circuit 43 converts the potential difference between the detection voltage V<3, 3> that has charged the first capacitive element C1<3>_1 and the detection voltage V<3, 2> that has charged the second capacitive element C2<3>_1 into a digital signal. The digital signal processing circuit (for example, the signal processing circuit 44) at the subsequent stage inverts the signs of the digitalized data.

At sampling time H illustrated in FIG. 21, the A/D conversion circuit 43 converts the potential difference between the detection voltage V<P, 3> that has charged the first capacitive element C1<P>_1 and the detection voltage V<P, 2> that has charged the second capacitive element C2<P>_1 into a digital signal. The digital signal processing circuit (for example, the signal processing circuit 44) at the subsequent stage inverts the signs of the digitalized data.

Specifically, at sampling time E illustrated in FIG. 21, the A/D conversion circuit 43 converts the potential difference between the detection voltage V<P+1, 3> that has charged the first capacitive element C1<1>_2 and the detection voltage V<P+1, 2> that has charged the second capacitive element C2<1>_2 into a digital signal. The digital signal processing circuit (for example, the signal processing circuit 44) at the subsequent stage inverts the signs of the digitalized data.

At sampling time F illustrated in FIG. 21, the A/D conversion circuit 43 converts the potential difference between the detection voltage V<P+2, 3> that has charged the first capacitive element C1<2>_2 and the detection voltage V<P+2, 2> that has charged the second capacitive element C2<2>_2 into a digital signal. The digital signal processing circuit (for example, the signal processing circuit 44) at the subsequent stage inverts the signs of the digitalized data.

At sampling time G illustrated in FIG. 21, the A/D conversion circuit 43 converts the potential difference between the detection voltage V<P+3, 3> that has charged the first capacitive element C1<3>_2 and the detection voltage V<P+3, 2> that has charged the second capacitive element C2<3>_2 into a digital signal. The digital signal processing circuit (for example, the signal processing circuit 44) at the subsequent stage inverts the signs of the digitalized data.

At sampling time H illustrated in FIG. 21, the A/D conversion circuit 43 converts the potential difference between the detection voltage V<P, 3> that has charged the first capacitive element C1<P>_2 and the detection voltage V<P, 2> that has charged the second capacitive element C2<P>_2 into a digital signal. The digital signal processing circuit (for example, the signal processing circuit 44) at the subsequent stage inverts the signs of the digitalized data.

Specifically, at sampling time E illustrated in FIG. 21, the A/D conversion circuit 43 converts the potential difference between the detection voltage V<M−P+1, 3> that has charged the first capacitive element C1<1>_M/P and the detection voltage V<M−P+1, 2> that has charged the second capacitive element C2<1>_M/P into a digital signal. The digital signal processing circuit (for example, the signal processing circuit 44) at the subsequent stage inverts the signs of the digitalized data.

At sampling time F illustrated in FIG. 21, the A/D conversion circuit 43 converts the potential difference between the detection voltage V<M−P+2, 3> that has charged the first capacitive element C1<2>_M/P and the detection voltage V<M−P+2, 2> that has charged the second capacitive element C2<2>_M/P into a digital signal. The digital signal processing circuit (for example, the signal processing circuit 44) at the subsequent stage inverts the signs of the digitalized data.

At sampling time G illustrated in FIG. 21, the A/D conversion circuit 43 converts the potential difference between the detection voltage V<M−P+3, 3> that has charged the first capacitive element C1<3>_M/P and the detection voltage V<M−P+3, 2> that has charged the second capacitive element C2<3>_M/P into a digital signal. The digital signal processing circuit (for example, the signal processing circuit 44) at the subsequent stage inverts the signs of the digitalized data.

At sampling time H illustrated in FIG. 21, the A/D conversion circuit 43 converts the potential difference between the detection voltage V<M, 3> that has charged the first capacitive element C1<P>_M/P and the detection voltage V<M, 2> that has charged the second capacitive element C2<P>_M/P into a digital signal. The digital signal processing circuit (for example, the signal processing circuit 44) at the subsequent stage inverts the signs of the digitalized data.

In the subsequent "L" period of the differential input switching signal SSW in synchronization with the "H" period of the read control scan line GLrd<4>, when the signal line selection signals ASW<1>, ASW<2>, . . . , ASW<P> are sequentially set to "H" (high-level voltage), the capacitance switching signals CSW2<p> are sequentially set to "H" (high-level voltage) in synchronization with the signal line selection signals ASW<1>, ASW<2>, . . . , ASW<P>. This operation charges each of the second capacitive elements C2<p>_1, C2<p>_2, . . . , C2<p>_M/P with an electric charge corresponding to the detection voltage V<p, 4> of the detection element 3<p, 4>. At this time, the electric charges that have charged the first capacitive elements C1<p>_1, C1<p>_2, . . . , C1<p>_M/P are being held.

In this "H" period of the read control scan line GLrd<4>, the capacitance switching signal CSW1<p> is set to "H" (high-level voltage) in synchronization with the capacitance switching signal CSW2<p>. As a result, the detection circuit 48a obtains the digital data corresponding to the potential differences between the detection voltages of the detection elements 3<p, 3> that have charged the first capacitive elements C1<p>_1, C1<p>_2, . . . , C1<p>_M/P and the detection voltages of the detection elements 3<p, 4> that have charged the second capacitive elements C2<p>_1, C2<p>_2, . . . , C2<p>_M/P.

Specifically, at sampling time I illustrated in FIG. 21, the A/D conversion circuit 43 converts the potential difference between the detection voltage V<1, 3> that has charged the first capacitive element C1<1>_1 and the detection voltage V<1, 4> that has charged the second capacitive element C2<1>_1 into a digital signal.

At sampling time J illustrated in FIG. 21, the A/D conversion circuit 43 converts the potential difference between the detection voltage V<2, 3> that has charged the first capacitive element C1<2>_1 and the detection voltage V<2, 4> that has charged the second capacitive element C2<2>_1 into a digital signal.

At sampling time K illustrated in FIG. 21, the A/D conversion circuit 43 converts the potential difference between the detection voltage V<3, 3> that has charged the first capacitive element C1<3>_1 and the detection voltage V<3, 4> that has charged the second capacitive element C2<3>_1 into a digital signal.

At sampling time L illustrated in FIG. 21, the A/D conversion circuit 43 converts the potential difference between the detection voltage V<P, 3> that has charged the first capacitive element C1<P>_1 and the detection voltage V<P, 4> that has charged the second capacitive element C2<P>_1 into a digital signal.

Specifically, at sampling time I illustrated in FIG. 21, the A/D conversion circuit 43 converts the potential difference between the detection voltage V<P+1, 3> that has charged the first capacitive element C1<1>_2 and the detection voltage V<P+1, 4> that has charged the second capacitive element C2<1>_2 into a digital signal.

At sampling time J illustrated in FIG. 21, the A/D conversion circuit 43 converts the potential difference between the detection voltage V<P+2, 3> that has charged the first capacitive element C1<2>_2 and the detection voltage V<P+2, 4> that has charged the second capacitive element C2<2>_2 into a digital signal.

At sampling time K illustrated in FIG. 21, the A/D conversion circuit 43 converts the potential difference between the detection voltage V<P+3, 3> that has charged the first capacitive element C1<3>_2 and the detection voltage V<P+3, 4> that has charged the second capacitive element C2<3>_2 into a digital signal.

At sampling time L illustrated in FIG. 21, the A/D conversion circuit 43 converts the potential difference between the detection voltage V<P, 3> that has charged the first capacitive element C1<P>_2 and the detection voltage V<P, 4> that has charged the second capacitive element C2<P>_2 into a digital signal.

Specifically, at sampling time I illustrated in FIG. 21, the A/D conversion circuit 43 converts the potential difference between the detection voltage V<M−P+1, 3> that has charged the first capacitive element C1<1>_M/P and the detection voltage V<M−P+1, 4> that has charged the second capacitive element C2<1>_M/P into a digital signal.

At sampling time J illustrated in FIG. 21, the A/D conversion circuit 43 converts the potential difference between the detection voltage V<M−P+2, 3> that has charged the first capacitive element C1<2>_M/P and the detection voltage V<M−P+2, 4> that has charged the second capacitive element C2<2>_M/P into a digital signal.

At sampling time K illustrated in FIG. 21, the A/D conversion circuit 43 converts the potential difference between the detection voltage V<M−P+3, 3> that has charged the first capacitive element C1<3>_M/P and the detection voltage V<M−P+3, 4> that has charged the second capacitive element C2<3>_M/P into a digital signal.

At sampling time L illustrated in FIG. 21, the A/D conversion circuit 43 converts the potential difference between the detection voltage V<M, 3> that has charged the first capacitive element C1<P>_M/P and the detection voltage V<M, 4> that has charged the second capacitive element C2<P>_M/P into a digital signal.

In the "H" period of the differential input switching signal SSW in synchronization with the "H" period of the read control scan line GLrd<N−1>, when the signal line selection signals ASW<1>, ASW<2>, . . . , ASW<P> are sequentially set to "H" (high-level voltage), the capacitance switching signals CSW1<p> are sequentially set to "H" (high-level voltage) in synchronization with the signal line selection signals ASW<1>, ASW<2>, . . . , ASW<P>. This operation charges each of the first capacitive elements C1<p>_1, C1<p>_2, . . . , C1<p>_M/P with an electric charge corresponding to the detection voltage V<p, N−1> of the detection element 3<p, N−1>.

In the subsequent "L" period of the differential input switching signal SSW in synchronization with the "H" period of the read control scan line GLrd<N>, when the signal line selection signals ASW<1>, ASW<2>, . . . , ASW<P> are sequentially set to "H" (high-level voltage), the capacitance switching signals CSW2<p> are sequentially set to "H" (high-level voltage) in synchronization with the signal line selection signals ASW<1>, ASW<2>, . . . , ASW<P>. This operation charges each of the second capacitive elements C2<p>_1, C2<p>_2, . . . , C2<p>_M/P with an electric charge corresponding to the detection voltage V<p, N> of the detection element 3<p, N>. At this time, the electric charges that have charged the first capacitive elements C1<p>_1, C1<p>_2, . . . , C1<p>_M/P are being held.

In this "H" period of the read control scan line GLrd<N>, the capacitance switching signal CSW1<p> is set to "H" (high-level voltage) in synchronization with the capacitance switching signal CSW2<p>. As a result, the detection circuit 48a obtains the digital data corresponding to the potential differences between the detection voltages of the detection elements 3<p, N−1> that have charged the first capacitive elements C1<p>_1, C1<p>_2, . . . , C1<p>_M/P and the detection voltages of the detection elements 3<p, N> that have charged the second capacitive elements C2<p>_1, C2<p>_2, . . . , C2<p>_M/P.

Specifically, at sampling time M illustrated in FIG. 21, the A/D conversion circuit 43 converts the potential difference between the detection voltage V<1, N−1> that has charged the first capacitive element C1<1>_1 and the detection voltage V<1, N> that has charged the second capacitive element C2<1>_1 into a digital signal.

At sampling time N illustrated in FIG. 21, the A/D conversion circuit 43 converts the potential difference between the detection voltage V<2, N−1> that has charged the first capacitive element C1<2>_1 and the detection voltage V<2, N> that has charged the second capacitive element C2<2>_1 into a digital signal.

At sampling time O illustrated in FIG. 21, the A/D conversion circuit 43 converts the potential difference between the detection voltage V<3, N−1> that has charged the first capacitive element C1<3>_1 and the detection voltage V<3, N> that has charged the second capacitive element C2<3>_1 into a digital signal.

At sampling time P illustrated in FIG. 21, the A/D conversion circuit 43 converts the potential difference between the detection voltage V<P, N−1> that has charged the first capacitive element C1<P>_1 and the detection voltage V<P, N> that has charged the second capacitive element C2<P>_1 into a digital signal.

Specifically, at sampling time M illustrated in FIG. 21, the A/D conversion circuit 43 converts the potential difference between the detection voltage V<P+1, N−1> that has charged the first capacitive element C1<1>_2 and the detection voltage V<P+1, N> that has charged the second capacitive element C2<1>_2 into a digital signal.

At sampling time N illustrated in FIG. 21, the A/D conversion circuit 43 converts the potential difference between the detection voltage V<P+2, N−1> that has charged the first capacitive element C1<2>_2 and the detection voltage V<P+2, N> that has charged the second capacitive element C2<2>_2 into a digital signal.

At sampling time O illustrated in FIG. 21, the A/D conversion circuit 43 converts the potential difference between the detection voltage V<P+3, N−1> that has charged the first capacitive element C1<3>_2 and the detection voltage V<P+3, N> that has charged the second capacitive element C2<3>_2 into a digital signal.

At sampling time P illustrated in FIG. 21, the A/D conversion circuit 43 converts the potential difference between the detection voltage V<P, N−1> that has charged the first capacitive element C1<P>_2 and the detection voltage V<P, N> that has charged the second capacitive element C2<P>_2 into a digital signal.

Specifically, at sampling time M illustrated in FIG. 21, the A/D conversion circuit 43 converts the potential difference between the detection voltage V<M−P+1, N−1> that has charged the first capacitive element C1<1>_M/P and the detection voltage V<M−P+1, N> that has charged the second capacitive element C2<1>_M/P into a digital signal.

At sampling time N illustrated in FIG. 21, the A/D conversion circuit 43 converts the potential difference between the detection voltage V<M−P+2, N−1> that has charged the first capacitive element C1<2>_M/P and the detection voltage V<M−P+2, N> that has charged the second capacitive element C2<2>_M/P into a digital signal.

At sampling time O illustrated in FIG. 21, the A/D conversion circuit 43 converts the potential difference between the detection voltage V<M−P+3, N−1> that has charged the first capacitive element C1<3>_M/P and the detection voltage V<M−P+3, N> that has charged the second capacitive element C2<3>_M/P into a digital signal.

At sampling time P illustrated in FIG. 21, the A/D conversion circuit 43 converts the potential difference between the detection voltage V<M, N−1> that has charged the first capacitive element C1<P>_M/P and the detection voltage V<M, N> that has charged the second capacitive element C2<P>_M/P into a digital signal.

Thus, with the configuration illustrated in FIG. 20, the digital data corresponding to the potential difference in the detection voltage between two of the detection elements 3 adjacent in the second direction Dy can be obtained by executing the combination of the reset period Prst, the exposure period Pch, and the read period Pdet for one cycle during the detection period FP. This configuration can make the detection period FP shorter than that with the configuration described above illustrated in FIG. 16.

Second Embodiment

In the first embodiment, the description has been given of the example of obtaining the digital data corresponding to the potential difference in the detection voltage between two of the detection elements 3 adjacent in the second direction Dy. In a second embodiment of the present disclosure, description will be given of an example of obtaining the digital data corresponding to the potential difference in the detection voltage between two of the detection elements 3 adjacent in the first direction Dx.

Figure 24:
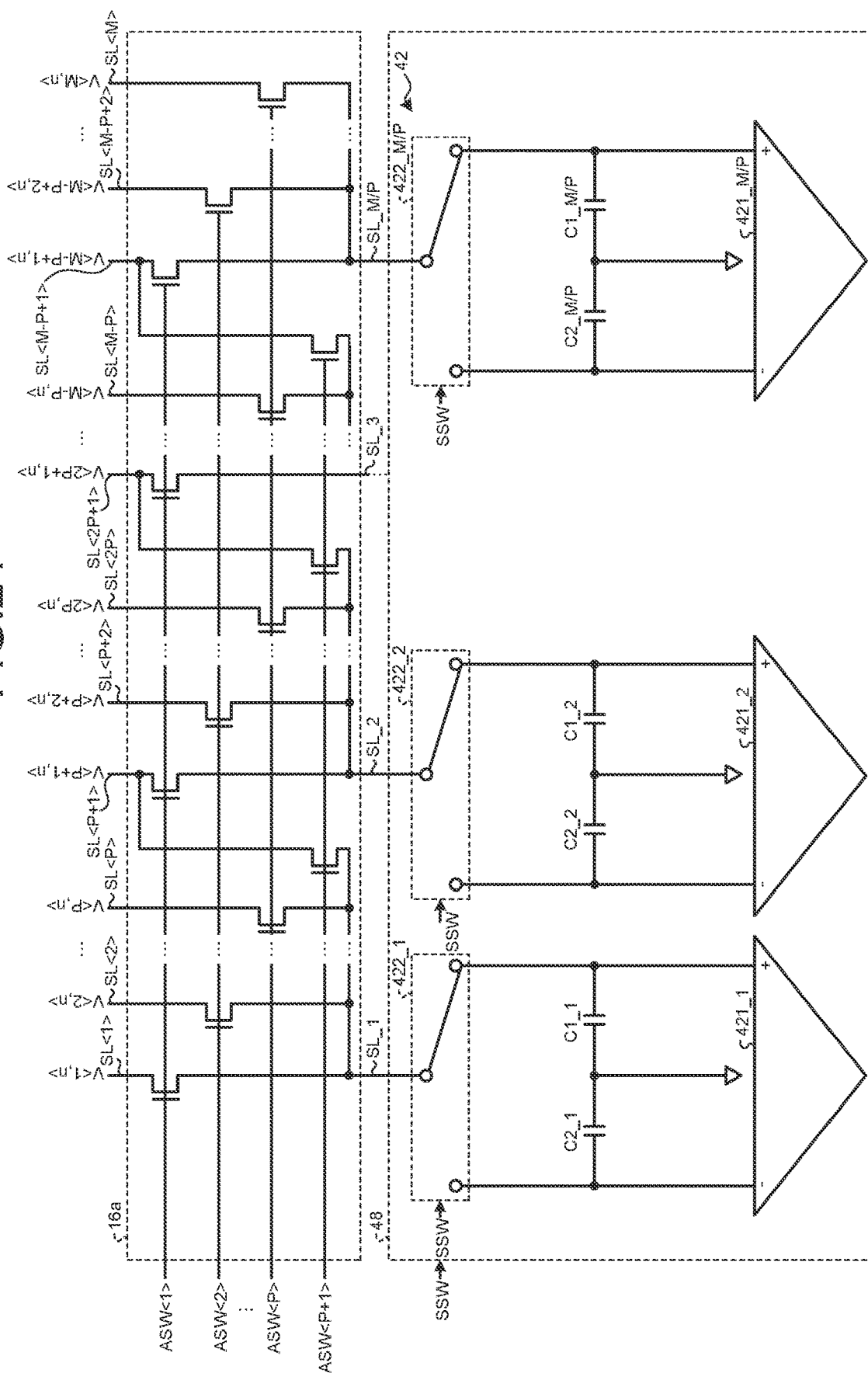
FIG. 24 is a diagram illustrating a configuration example of a signal line selection circuit and the detection circuit according to a second embodiment of the present disclosure.
Figure 25:
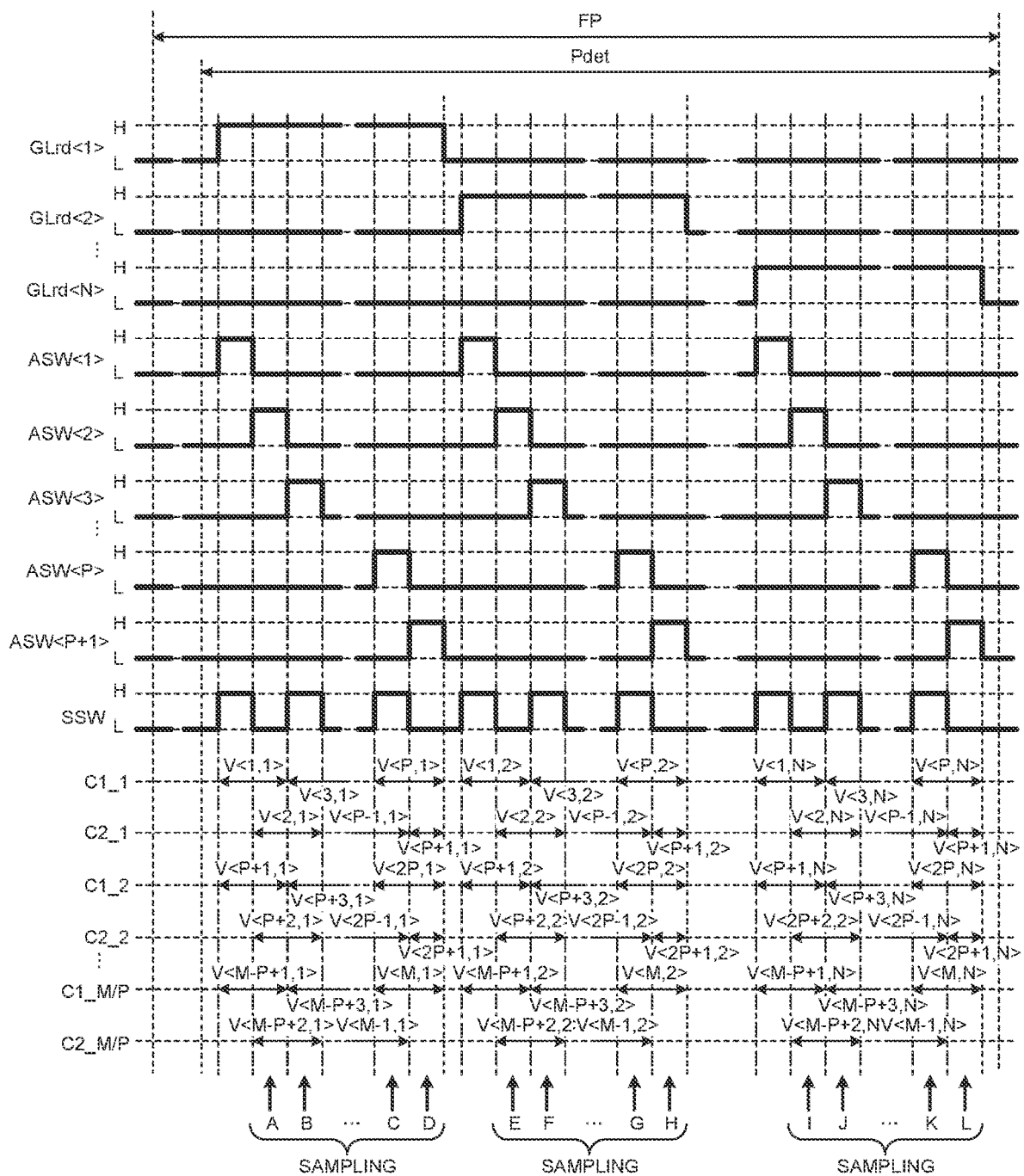
FIG. 25 is a diagram illustrating an exemplary timing diagram during the detection operation of the signal line selection circuit and the detection circuit according to the second embodiment.

FIG. 24 is a diagram illustrating a configuration example of a signal line selection circuit and the detection circuit according to the second embodiment. FIG. 25 is a diagram illustrating an exemplary timing diagram during the detection operation of the signal line selection circuit and the detection circuit according to the second embodiment. FIG. 25 does not illustrate the reset period Prst and the exposure period Pch.

In the example illustrated in FIGS. 24 and 25, a signal line selection circuit 16a simultaneously selects the output signal lines SL electrically coupled to the differential amplifier circuits 421_1, 421_2, ..., 421_M/P along the first direction Dx based on the signal line selection signals ASW<1>, ASW<2>, ..., ASW<P>, ASW<P+1> (where P is a natural number of M/2 or smaller) supplied from the detection control circuit 11, and electrically couples the selected output signal lines SL to the detection circuit 48.

In the read period Pdet of the detection period FP, the second gate line drive circuit 15B sequentially selects the read control scan lines GLrd<1>, GLrd<2>, GLrd<3>, ..., ..., GLrd<N>, and supplies the read control signal RD to the selected read control scan lines GLrd. During the "H" period of each of the read control scan lines GLrd<1>, GLrd<2>, GLrd<3>, ..., GLrd<N>, the detection control circuit 11 sequentially sets the signal line selection signals ASW<1>, ASW<2>, ..., ASW<P>, ASW<P+1> to "H" (high-level voltage).

The detection circuit 48 according to the second embodiment has the same configuration as that in the first embodiment illustrated in FIG. 16. Specifically, in the present embodiment, in the same manner as in the first embodiment, one of the differential amplifier circuits 421_1, 421_2, ..., 421_M/P is provided for the output signal lines SL<p>, SL<P+p>, ..., SL<M−P+p> that are simultaneously selected by the signal line selection circuit 16a. The detection control circuit 11 switches the control state of the switch circuits 422_1, 422_2, ..., 422_M/P of the detection circuit 48 in synchronization with the signal line selection signals ASW<1>, ASW<2>, ..., ASW<P>, ASW<P+1>.

Specifically, for example, during the selection period of the output signal line SL<odd> in an odd-numbered column, the detection control circuit 11 sets the differential input switching signal SSW to "H" (high-level voltage), and performs control to apply the detection voltage V<odd, n> of the detection element 3<odd, n> in the odd-numbered column to the non-inverting input terminal (+) of the differential amplifier circuit 421.

For example, during the selection period of the output signal line SL<even> in an even-numbered column, the detection control circuit 11 sets the differential input switching signal SSW to "L" (low-level voltage), and performs control to apply the detection voltage V<even, n> of the detection element 3<even, n> in the even-numbered row to the inverting input terminal (−) of the differential amplifier circuit 421.

In the "H" period of the read control scan line GLrd<1>, when the differential input switching signal SSW is controlled to be "H" in the selection period of the output signal line SL<1>, the first capacitive element C1_1 is charged with an electric charge corresponding to the detection voltage V<1, 1> of the detection element 3<1, 1>; the first capacitive element C1_2 is charged with an electric charge corresponding to the detection voltage V<P+1, 1> of the detection element 3<P+1, 1>; and the first capacitive element C1_M/P is charged with an electric charge corresponding to the detection voltage V<M−P+1, 1> of the detection element 3<M−P+1, 1>.

When the differential input switching signal SSW is controlled to be "L" in the subsequent selection period of the output signal line SL<2>, the second capacitive element C2_2 is charged with an electric charge corresponding to the detection voltage V<2, 1> of the detection element 3<2, 1>; the second capacitive element C2_2 is charged with an electric charge corresponding to the detection voltage V<P+2, 1> of the detection element 3<P+2, 1>; and the second capacitive element C2_M/P is charged with an electric charge corresponding to the detection voltage V<M−P+2, 1> of the detection element 3<M−P+2, 1>. At this time, the electric charges that have charged the first capacitive elements C1_1, C1_2, . . . , C1_M/P are being held.

In this selection period of the output signal line SL<2>, more specifically, at sampling time A illustrated in FIG. 25, the A/D conversion circuit 43 converts the potential difference between the detection voltage V<1, 1> of the detection element 3<1, 1> that has charged the first capacitive element C1_1 and the detection voltage V<2, 1> of the detection element 3<2, 1> that has charged the second capacitive element C2_1 into a digital signal, converts the potential difference between the detection voltage V<P+1, 1> of the detection element 3<P+1, 1> that has charged the first capacitive element C1_2 and the detection voltage V<P+2, 1> of the detection element 3<P+2, 1> that has charged the second capacitive element C2_2 into a digital signal, and converts the potential difference between the detection voltage V<M−P+1, 1> of the detection element 3<M−P+1, 1> that has charged the first capacitive element C1_M/P and the detection voltage V<M−P+2, 1> of the detection element 3<M−P+2, 1> that has charged the second capacitive element C2_M/P into a digital signal.

When the differential input switching signal SSW is controlled to be "H" in the subsequent selection period of the output signal line SL<3>, the first capacitive element C1_1 is charged with an electric charge corresponding to the detection voltage V<3, 1> of the detection element 3<3, 1>; the first capacitive element C1_3 is charged with an electric charge corresponding to the detection voltage V<P+3, 1> of the detection element 3<P+3, 1>; and the first capacitive element C1_M/P is charged with an electric charge corresponding to the detection voltage V<M−P+3, 1> of the detection element 3<M−P+3, 1>. At this time, the electric charges that have charged the second capacitive elements C2_1, C2_2, . . . , C2_M/P are being held.

In this selection period of the output signal line SL<3>, more specifically, at sampling time B illustrated in FIG. 25, the A/D conversion circuit 43 converts the potential difference between the detection voltage V<3, 1> of the detection element 3<3, 1> that has charged the first capacitive element C1_1 and the detection voltage V<2, 1> of the detection element 3<2, 1> that has charged the second capacitive element C2_1 into a digital signal, converts the potential difference between the detection voltage V<P+3, 1> of the detection element 3<P+3, 1> that has charged the first capacitive element C1_2 and the detection voltage V<P+2, 1> of the detection element 3<P+2, 1> that has charged the second capacitive element C2_2 into a digital signal, and converts the potential difference between the detection voltage V<M−P+3, 1> of the detection element 3<M−P+3, 1> that has charged the first capacitive element C1_M/P and the detection voltage V<M−P+2, 1> of the detection element 3<M−P+2, 1> that has charged the second capacitive element C2_M/P into a digital signal. The digital signal processing circuit (for example, the signal processing circuit 44) at the subsequent stage inverts the signs of the digitalized data.

When the differential input switching signal SSW is controlled to be "H" in the subsequent selection period of the output signal line SL<P>, the first capacitive element C1_1 is charged with an electric charge corresponding to the detection voltage V<P, 1> of the detection element 3<P, 1>; the first capacitive element C1_2 is charged with an electric charge corresponding to the detection voltage V<2P, 1> of the detection element 3<2P, 1>; and the first capacitive element C1_M/P is charged with an electric charge corresponding to the detection voltage V<M, 1> of the detection element 3<M, 1>. At this time, the electric charges that have charged the second capacitive elements C2_1, C2_2, . . . , C2_M/P are being held.

In this selection period of the output signal line SL<P>, more specifically, at sampling time C illustrated in FIG. 25, the A/D conversion circuit 43 converts the potential difference between the detection voltage V<P, 1> of the detection element 3<P, 1> that has charged the first capacitive element C1_1 and the detection voltage V<P−1, 1> of the detection element 3<P−1, 1> that has charged the second capacitive element C2_1 into a digital signal, converts the potential difference between the detection voltage V<2P, 1> of the detection element 3<2P, 1> that has charged the first capacitive element C1_2 and the detection voltage V<2P−1, 1> of the detection element 3<2P−1, 1> that has charged the second capacitive element C2_2 into a digital signal, and converts the potential difference between the detection voltage V<M, 1> of the detection element 3<M, 1> that has charged the first capacitive element C1_M/P and the detection voltage V<M−1, 1> of the detection element 3<M−1, 1> that has charged the second capacitive element C2_M/P into a digital signal. The digital signal processing circuit (for example, the signal processing circuit 44) at the subsequent stage inverts the signs of the digitalized data.

When the differential input switching signal SSW is controlled to be "L" in the subsequent selection period of the output signal line SL<P+1>, the second capacitive element C2_2 is charged with an electric charge corresponding to the detection voltage V<P+1, 1> of the detection element 3<P+1, 1>, and the second capacitive element C2_2 is charged with an electric charge corresponding to the detection voltage V<2P+1, 1> of the detection element 3<2P+1, 1>. At this time, the electric charges that have charged the first capacitive elements C1_1, C1_2, . . . , C1_M/P are being held.

In this selection period of the output signal line SL<P+1>, more specifically, at sampling time D illustrated in FIG. 25, the A/D conversion circuit 43 converts the potential difference between the detection voltage V<P, 1> of the detection element 3<P, 1> that has charged the first capacitive element C1_1 and the detection voltage V<P+1, 1> of the detection element 3<P+1, 1> that has charged the second capacitive element C2_1 into a digital signal, and converts the potential difference between the detection voltage V<2P, 1> of the detection element 3<2P, 1> that has charged the first capacitive element C1_2 and the detection voltage V<2P+1, 1> of the detection element 3<2P+1, 1> that has charged the second capacitive element C2_2 into a digital signal.

In the "H" period of the read control scan line GLrd<2>, when the differential input switching signal SSW is controlled to be "H" in the selection period of the output signal line SL<1>, the first capacitive element C1_1 is charged with an electric charge corresponding to the detection voltage V<1, 2> of the detection element 3<1, 2>; the first capacitive element C1_2 is charged with an electric charge corresponding to the detection voltage V<P+1, 2> of the detection element 3<P+1, 2>; and the first capacitive element C1_M/P is charged with an electric charge corresponding to the detection voltage V<M−P+1, 2> of the detection element 3<M−P+1, 2>.

When the differential input switching signal SSW is controlled to be "L" in the subsequent selection period of the output signal line SL<2>, the second capacitive element C2_2 is charged with an electric charge corresponding to the detection voltage V<2, 2> of the detection element 3<2, 2>; the second capacitive element C2_2 is charged with an electric charge corresponding to the detection voltage V<P+2, 2> of the detection element 3<P+2, 2>; and the second capacitive element C2_M/P is charged with an electric charge corresponding to the detection voltage V<M−P+2, 2> of the detection element 3<M−P+2, 2>. At this time, the electric charges that have charged the first capacitive elements C1_1, C1_2, . . . , C1_M/P are being held.

In this selection period of the output signal line SL<2>, more specifically, at sampling time E illustrated in FIG. 25, the A/D conversion circuit 43 converts the potential difference between the detection voltage V<1, 2> of the detection element 3<1, 2> that has charged the first capacitive element C1_1 and the detection voltage V<2, 2> of the detection element 3<2, 2> that has charged the second capacitive element C2_1 into a digital signal, converts the potential difference between the detection voltage V<P+1, 2> of the detection element 3<P+1, 2> that has charged the first capacitive element C1_2 and the detection voltage V<P+2, 2> of the detection element 3<P+2, 2> that has charged the second capacitive element C2_2 into a digital signal, and converts the potential difference between the detection voltage V<M−P+1, 2> of the detection element 3<M−P+1, 2> that has charged the first capacitive element C1_M/P and the detection voltage V<M−P+2, 2> of the detection element 3<M−P+2, 2> that has charged the second capacitive element C2_M/P into a digital signal.

When the differential input switching signal SSW is controlled to be "H" in the subsequent selection period of the output signal line SL<3>, the first capacitive element C1_1 is charged with an electric charge corresponding to the detection voltage V<3, 2> of the detection element 3<3, 2>; the first capacitive element C1_3 is charged with an electric charge corresponding to the detection voltage V<P+3, 2> of the detection element 3<P+3, 2>; and the first capacitive element C1_M/P is charged with an electric charge corresponding to the detection voltage V<M−P+3, 2> of the detection element 3<M−P+3, 2>. At this time, the electric charges that have charged the second capacitive elements C2_1, C2_2, . . . , C2_M/P are being held.

In this selection period of the output signal line SL<3>, more specifically, at sampling time F illustrated in FIG. 25, the A/D conversion circuit 43 converts the potential difference between the detection voltage V<3, 2> of the detection element 3<3, 2> that has charged the first capacitive element C1_1 and the detection voltage V<2, 2> of the detection element 3<2, 2> that has charged the second capacitive element C2_1 into a digital signal, converts the potential difference between the detection voltage V<P+3, 2> of the detection element 3<P+3, 2> that has charged the first capacitive element C1_2 and the detection voltage V<P+2, 2> of the detection element 3<P+2, 2> that has charged the second capacitive element C2_2 into a digital signal, and converts the potential difference between the detection voltage V<M−P+3, 2> of the detection element 3<M−P+3, 2> that has charged the first capacitive element C1_M/P and the detection voltage V<M−P+2, 2> of the detection element 3<M−P+2, 2> that has charged the second capacitive element C2_M/P into a digital signal. The digital signal processing circuit (for example, the signal processing circuit 44) at the subsequent stage inverts the signs of the digitalized data.

When the differential input switching signal SSW is controlled to be "H" in the selection period of the output signal line SL<P>, the first capacitive element C1_1 is charged with an electric charge corresponding to the detection voltage V<P, 2> of the detection element 3<P, 2>; the first capacitive element C1_2 is charged with an electric charge corresponding to the detection voltage V<2P, 2> of the detection element 3<2P, 2>; and the first capacitive element C1_M/P is charged with an electric charge corresponding to the detection voltage V<M, 2> of the detection element 3<M, 2>. At this time, the electric charges that have charged the second capacitive elements C2_1, C2_2, . . . , C2_M/P are being held.

In this selection period of the output signal line SL<P>, more specifically, at sampling time G illustrated in FIG. 25, the A/D conversion circuit 43 converts the potential difference between the detection voltage V<P, 2> of the detection element 3<P, 2> that has charged the first capacitive element C1_1 and the detection voltage V<P−1, 2> of the detection element 3<P−1, 2> that has charged the second capacitive element C2_1 into a digital signal, converts the potential difference between the detection voltage V<2P, 2> of the detection element 3<2P, 2> that has charged the first capacitive element C1_2 and the detection voltage V<2P−1, 2> of the detection element 3<2P−1, 2> that has charged the second capacitive element C2_2 into a digital signal, and converts the potential difference between the detection voltage V<M, 2> of the detection element 3<M, 2> that has charged the first capacitive element C1_M/P and the detection voltage V<M−1, 2> of the detection element 3<M−1, 2> that has charged the second capacitive element C2_M/P into a digital signal. The digital signal processing circuit (for example, the signal processing circuit 44) at the subsequent stage inverts the signs of the digitalized data.

When the differential input switching signal SSW is controlled to be "L" in the subsequent selection period of the output signal line SL<P+1>, the second capacitive element C2_2 is charged with an electric charge corresponding to the detection voltage V<P+1, 2> of the detection element 3<P+1, 2>, and the second capacitive element C2_2 is charged with an electric charge corresponding to the detection voltage V<2P+1, 2> of the detection element 3<2P+1, 2>. At this time, the electric charges that have charged the first capacitive elements C1_1, C1_2, . . . , C1_M/P are being held.

In this selection period of the output signal line SL<P+1>, more specifically, at sampling time H illustrated in FIG. 25, the A/D conversion circuit 43 converts the potential difference between the detection voltage V<P, 2> of the detection element 3<P, 2> that has charged the first capacitive element C1_1 and the detection voltage V<P+1, 2> of the detection element 3<P+1, 2> that has charged the second capacitive element C2_1 into a digital signal, and converts the potential difference between the detection voltage V<2P, 2> of the detection element 3<2P, 2> that has charged the first capacitive element C1_2 and the detection voltage V<2P+1, 2> of the detection element 3<2P+1, 2> that has charged the second capacitive element C2_2 into a digital signal.

In the "H" period of the read control scan line GLrd<N>, when the differential input switching signal SSW is controlled to be "H" in the selection period of the output signal line SL<1>, the first capacitive element C1_1 is charged with an electric charge corresponding to the detection voltage V<1, N> of the detection element 3<1, N>; the first capacitive element C1_2 is charged with an electric charge corresponding to the detection voltage V<P+1, N> of the detection element 3<P+1, N>; and the first capacitive element C1_M/P is charged with an electric charge corresponding to the detection voltage V<M−P+1, N> of the detection element 3<M−P+1, N>.

When the differential input switching signal SSW is controlled to be "L" in the subsequent selection period of the output signal line SL<2>, the second capacitive element C2_2 is charged with an electric charge corresponding to the detection voltage V<2, N> of the detection element 3<2, N>; the second capacitive element C2_2 is charged with an electric charge corresponding to the detection voltage V<P+2, N> of the detection element 3<P+2, N>; and the second capacitive element C2_M/P is charged with an electric charge corresponding to the detection voltage V<M−P+2, N> of the detection element 3<M−P+2, N>. At this time, the electric charges that have charged the first capacitive elements C1_1, C1_2, . . . , C1_M/P are being held.

In this selection period of the output signal line SL<2>, more specifically, at sampling time I illustrated in FIG. 25, the A/D conversion circuit 43 converts the potential difference between the detection voltage V<1, N> of the detection element 3<1, N> that has charged the first capacitive element C1_1 and the detection voltage V<2, N> of the detection element 3<2, N> that has charged the second capacitive element C2_1 into a digital signal, converts the potential difference between the detection voltage V<P+1, N> of the detection element 3<P+1, N> that has charged the first capacitive element C1_2 and the detection voltage V<P+2, N> of the detection element 3<P+2, N> that has charged the second capacitive element C2_2 into a digital signal, and converts the potential difference between the detection voltage V<M−P+1, N> of the detection element 3<M−P+1, N> that has charged the first capacitive element C1_M/P and the detection voltage V<M−P+2, N> of the detection element 3<M−P+2, N> that has charged the second capacitive element C2_M/P into a digital signal.

When the differential input switching signal SSW is controlled to be "H" in the subsequent selection period of the output signal line SL<3>, the first capacitive element C1_1 is charged with an electric charge corresponding to the detection voltage V<3, N> of the detection element 3<3, N>; the first capacitive element C1_3 is charged with an electric charge corresponding to the detection voltage V<P+3, N> of the detection element 3<P+3, N>; and the first capacitive element C1_M/P is charged with an electric charge corresponding to the detection voltage V<M−P+3, N> of the detection element 3<M−P+3, N>. At this time, the electric charges that have charged the second capacitive elements C2_1, C2_2, . . . , C2_M/P are being held.

In this selection period of the output signal line SL<3>, more specifically, at sampling time J illustrated in FIG. 25, the A/D conversion circuit 43 converts the potential difference between the detection voltage V<3, N> of the detection element 3<3, N> that has charged the first capacitive element C1_1 and the detection voltage V<2, N> of the detection element 3<2, N> that has charged the second capacitive element C2_1 into a digital signal, converts the potential difference between the detection voltage V<P+3, N> of the detection element 3<P+3, N> that has charged the first capacitive element C1_2 and the detection voltage V<P+2, N> of the detection element 3<P+2, N> that has charged the second capacitive element C2_2 into a digital signal, and converts the potential difference between the detection voltage V<M−P+3, N> of the detection element 3<M−P+3, N> that has charged the first capacitive element C1_M/P and the detection voltage V<M−P+2, N> of the detection element 3<M−P+2, N> that has charged the second capacitive element C2_M/P into a digital signal. The digital signal processing circuit (for example, the signal processing circuit 44) at the subsequent stage inverts the signs of the digitalized data.

When the differential input switching signal SSW is controlled to be "H" in the selection period of the output signal line SL<P>, the first capacitive element C1_1 is charged with an electric charge corresponding to the detection voltage V<P, N> of the detection element 3<P, N>; the first capacitive element C1_2 is charged with an electric charge corresponding to the detection voltage V<2P, N> of the detection element 3<2P, N>; and the first capacitive element C1_M/P is charged with an electric charge corresponding to the detection voltage V<M, N> of the detection element 3<M, N>. At this time, the electric charges that have charged the second capacitive elements C2_1, C2_2, . . . , C2_M/P are being held.

In this selection period of the output signal line SL<P>, more specifically, at sampling time K illustrated in FIG. 25, the A/D conversion circuit 43 converts the potential difference between the detection voltage V<P, N> of the detection element 3<P, N> that has charged the first capacitive element C1_1 and the detection voltage V<P−1, N> of the detection element 3<P−1, N> that has charged the second capacitive element C2_1 into a digital signal, converts the potential difference between the detection voltage V<2P, N> of the detection element 3<2P, N> that has charged the first capacitive element C1_2 and the detection voltage V<2P−1, N> of the detection element 3<2P−1, N> that has charged the second capacitive element C2_2 into a digital signal, and converts the potential difference between the detection voltage V<M, N> of the detection element 3<M, N> that has charged the first capacitive element C1_M/P and the detection voltage V<M−1, N> of the detection element 3<M−1, N> that has charged the second capacitive element C2_M/P into a digital signal. The digital signal processing circuit (for example, the signal processing circuit 44) at the subsequent stage inverts the signs of the digitalized data.

When the differential input switching signal SSW is controlled to be "L" in the subsequent selection period of the output signal line SL<P+1>, the second capacitive element C2_2 is charged with an electric charge corresponding to the detection voltage V<P+1, N> of the detection element 3<P+1, N>, and the second capacitive element C2_2 is charged with an electric charge corresponding to the detection voltage V<2P+1, N> of the detection element 3<2P+1, N>. At this time, the electric charges that have charged the first capacitive elements C1_1, C1_2, . . . , C1_M/P are being held.

In this selection period of the output signal line SL<P+1>, more specifically, at sampling time L illustrated in FIG. 25, the A/D conversion circuit 43 converts the potential difference between the detection voltage V<P, N> of the detection element 3<P, N> that has charged the first capacitive element C1_1 and the detection voltage V<P+1, N> of the detection element 3<P+1, N> that has charged the second capacitive element C2_1 into a digital signal, and converts the potential difference between the detection voltage V<2P, N> of the detection element 3<2P, N> that has charged the first capacitive element C1_2 and the detection voltage V<2P+1, N> of the detection element 3<2P+1, N> that has charged the second capacitive element C2_2 into a digital signal.

FIG. 26 is a chart illustrating a correspondence relation of the digital data obtained at each sampling time in the timing diagram illustrated in FIG. 25. FIG. 27 is a chart illustrating examples of the digital data obtained during the detection operation of the signal line selection circuit and the detection circuit according to the second embodiment.

FIG. 27 illustrates the digital data when the Gain (degree of amplification) of the differential amplifier circuit 421 is "1". In FIG. 27, for example, the digital data corresponding to the potential difference between the detection element 3<m, n> and the detection element 3<m+1, n> is denoted as "V<m, n>–V<m+1, n>". In the present embodiment, the digital data corresponding to the potential difference in the detection voltage between two of the detection elements 3 adjacent in the first direction Dx is obtained by the configuration and the operation described above. Therefore, the number of the data in the row direction (first direction Dx, that is, the vertical direction illustrated in FIG. 27) is M–1 that is smaller by 1 than the number M of the detection elements 3 arranged in the row direction (first direction Dx).

The signal processing circuit 44 sequentially stores the digital data obtained in the detection period FP as the first detection values ΔV<m, n> in the storage circuit 46.

After the detection period FP ends, the signal processing circuit 44 performs the predetermined processing on the first detection values ΔV<m, n> stored in the storage circuit 46, and stores the results as the second detection values V<m, n> in the storage circuit 46. The "predetermined processing" is, for example, processing to obtain an image corresponding to an image drawn based on the digital data for each of the detection elements obtained by the detection device according to the comparative example described above.

The coordinate extraction circuit 45 generates the two-dimensional information (such as the image) representing the shape of the asperities on the surface of the finger Fg or the like, based on the second detection values V<m, n> stored in the storage circuit 46. In an aspect of the present disclosure, the signal processing circuit 44 may read the second detection values V<m, n> from the storage circuit 46 and output them to the coordinate extraction circuit 45, or in another aspect, the coordinate extraction circuit 45 may directly read the second detection values V<m, n> from the storage circuit 46. In an alternative aspect, the second detection values V<m, n> may be calculated by the signal processing circuit 44 and directly output to the coordinate extraction circuit 45 without being stored in and read from the storage circuit 46.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

What is claimed is:

1. A detection device comprising:
   a sensor area provided with a plurality of detection elements each comprising a photoelectric conversion element in a detection area; and
   a detector configured to detect a potential difference between a voltage generated in a first detection element and a voltage generated in a second detection element adjacent to the first detection element in the detection area, wherein
   the detection elements are arranged in a matrix having a row-column configuration in a first direction and a second direction different from the first direction in the detection area, and
   the detector is configured to detect the potential difference between the voltage generated in the first detection element and the voltage generated in the second detection element adjacent in the second direction to the first detection element in the detection area.

2. The detection device according to claim 1, further comprising:
   a read control scan line configured to supply a read control signal to the detection elements arranged in the first direction;
   a drive circuit configured to sequentially select the read control scan lines along the second direction; and
   an output signal line configured to be supplied with voltages generated in the detection elements arranged in the second direction, wherein
   the detector is electrically coupled to the output signal line.

3. The detection device according to claim 2, wherein the detector comprises:
   a differential amplifier circuit configured to output a potential difference between voltages generated in the detection elements adjacent in the second direction;
   a first capacitive element coupled to a non-inverting input terminal of the differential amplifier circuit;
   a second capacitive element coupled to an inverting input terminal of the differential amplifier circuit; and
   a switch circuit configured to electrically couple the output signal line to the non-inverting input terminal or the inverting input terminal of the differential amplifier circuit by switching between the non-inverting input terminal and the inverting input terminal in synchronization with selective switching of the read control scan line.

4. The detection device according to claim 3, wherein the differential amplifier circuit is configured to output a potential difference between a voltage that has charged the first capacitive element and a voltage that has charged the second capacitive element.

5. The detection device according to claim 3, wherein
   in the sensor area, N of the detection elements are arranged in the second direction in the detection area, and the detector is configured to invert a sign of an (n+1)th output value of the differential amplifier circuit with respect to an nth output value (where n is a natural number of N or smaller) of the differential amplifier circuit.

6. The detection device according to claim 5, further comprising a signal line selection circuit configured to simultaneously select more than one of all the output signal lines in the detection area, and electrically couple the selected output signal lines to the detector, wherein
the detector is provided with one of the differential amplifier circuits for the output signal lines simultaneously selected by the signal line selection circuit.

7. The detection device according to claim 6, wherein
the signal line selection circuit is configured to sequentially select the output signal lines to be electrically coupled to the differential amplifier circuit along the first direction in a selection period of the read control scan line, and
the differential amplifier circuit is configured to:
be coupled, through the non-inverting input terminal, parallelly to the first capacitive elements correspondingly to the respective output signal lines sequentially selected in the selection period of the read control scan line; and
be coupled, through the inverting input terminal, parallelly to the second capacitive elements correspondingly to the respective output signal lines sequentially selected in the selection period of the read control scan line.

8. The detection device according to claim 3, wherein the differential amplifier circuit is configured to amplify and output the potential difference between the voltage generated in the first detection element and the voltage generated in the second detection element adjacent in the second direction to the first detection element in the detection area.

9. The detection device according to claim 1, wherein
each of the detection elements comprises:
a reset transistor configured to apply a reset voltage to a cathode of the photoelectric conversion element;
a source follower transistor configured to output a signal corresponding to a voltage generated in the photoelectric conversion element; and
a read transistor configured to read the output signal of the source follower transistor.

10. A detection device comprising:
a sensor area provided with a plurality of detection elements each comprising a photoelectric conversion element in a detection area; and
a detector configured to detect a potential difference between a voltage generated in a first detection element and a voltage generated in a second detection element adjacent to the first detection element in the detection area, wherein
the detection elements are arranged in a matrix having a row-column configuration in a first direction and a second direction different from the first direction in the detection area, and
the detector is configured to detect the potential difference between the voltage generated in the first detection element and the voltage generated in the second detection element adjacent in the first direction to the first detection element in the detection area.

11. The detection device according to claim 10, further comprising:
a read control scan line configured to supply a read control signal to the detection elements arranged in the first direction;
a drive circuit configured to sequentially select the read control scan lines along the second direction; and
an output signal line configured to be supplied with voltages generated in the detection elements arranged in the second direction, wherein
the detector is electrically coupled to the output signal line.

12. The detection device according to claim 11, further comprising a signal line selection circuit configured to sequentially select more than one of all the output signal lines in the detection area along the first direction, and electrically couple the selected output signal lines to the detector in a selection period of the read control scan line, wherein
the detector comprises:
a differential amplifier circuit configured to output a potential difference between voltages generated in the detection elements adjacent in the first direction;
a first capacitive element coupled to a non-inverting input terminal of the differential amplifier circuit;
a second capacitive element coupled to an inverting input terminal of the differential amplifier circuit; and
a switch circuit configured to electrically couple the output signal line to the non-inverting input terminal or the inverting input terminal of the differential amplifier circuit by switching between the non-inverting input terminal and the inverting input terminal in synchronization with selective switching of the output signal lines.

13. The detection device according to claim 12, wherein the differential amplifier circuit is configured to output a potential difference between a voltage that has charged the first capacitive element and a voltage that has charged the second capacitive element.

14. The detection device according to claim 12, wherein
in the sensor area, M of the detection elements are arranged in the first direction in the detection area, and
the detector is configured to invert a sign of an (m+1)th output value of the differential amplifier circuit with respect to an mth output value (where m is a natural number of M or smaller) of the differential amplifier circuit.

15. The detection device according to claim 12, wherein the detector is provided with one of the differential amplifier circuits for the output signal lines sequentially selected by the signal line selection circuit.

16. The detection device according to claim 12, wherein the differential amplifier circuit is configured to amplify and output the potential difference between the voltage generated in the first detection element and the voltage generated in the second detection element adjacent in the first direction to the first detection element in the detection area.

* * * * *